United States Patent
Li et al.

(10) Patent No.: US 11,280,178 B2
(45) Date of Patent: Mar. 22, 2022

(54) WELLBORE FLUID LEVEL MONITORING SYSTEM

(71) Applicant: Saudi Arabian Oil Company, Dhahran (SA)

(72) Inventors: Bodong Li, Dhahran (SA); Chinthaka Pasan Gooneratne, Dhahran (SA); Guodong Zhan, Dhahran (SA); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 181 days.

(21) Appl. No.: 16/829,919

(22) Filed: Mar. 25, 2020

(65) Prior Publication Data

US 2021/0301648 A1 Sep. 30, 2021

(51) Int. Cl.
*E21B 47/00* (2012.01)
*E21B 47/047* (2012.01)
(Continued)

(52) U.S. Cl.
CPC ............ *E21B 47/047* (2020.05); *G01F 23/30* (2013.01)

(58) Field of Classification Search
CPC ........ E21B 21/08; E21B 47/047; E21B 47/00; G01F 1/00; G01F 1/002
See application file for complete search history.

(56) References Cited

U.S. PATENT DOCUMENTS

| | | |
|---|---|---|
| 891,957 A | 6/1908 | Schubert |
| 2,286,673 A | 6/1942 | Douglas |

(Continued)

FOREIGN PATENT DOCUMENTS

| | | |
|---|---|---|
| CA | 2669721 | 7/2011 |
| CN | 204627586 | 9/2015 |

(Continued)

OTHER PUBLICATIONS

PCT International Search Report and Written Opinion in International Appln. No. PCT/US2021/024097, dated Aug. 5, 2021, 13 pages.

(Continued)

*Primary Examiner* — Kipp C Wallace
(74) *Attorney, Agent, or Firm* — Fish & Richardson P.C.

(57) ABSTRACT

A wellbore fluid monitoring system includes a housing, a first sealing element, a second sealing element and a sealing unit. The housing is configured to be securely disposed in a portion of an annulus within a bell nipple below a rotary table of a wellbore drilling assembly. The annulus is formed by a drill string of the wellbore drilling assembly and an inner wall of a wellbore being drilled by the wellbore drilling assembly. The housing includes a first open end and a second open end. The housing is configured to house an air flow sensor disposed within the housing. The first sealing element is attached to the first open end of the housing. The first sealing element is configured to seal and unseal the first open end. The second sealing element is attached to the second open end of the housing. The second sealing element is configured to seal and unseal the second open end. The sealing unit is disposed in the portion of the annulus. The sealing unit is connected to the housing, the first sealing element and the second sealing element. The sealing unit is configured to actuate the first sealing element and the second sealing element to seal or unseal the first open end and the second open end, respectively, based on a liquid level in the portion of the annulus.

17 Claims, 16 Drawing Sheets

(51) Int. Cl.
    *E21B 21/08* (2006.01)
    *G01F 23/30* (2006.01)

(56) References Cited

U.S. PATENT DOCUMENTS

| | | | |
|---|---|---|---|
| 2,757,738 A | 9/1948 | Ritchey |
| 2,509,608 A | 5/1950 | Penfield |
| 2,688,369 A | 9/1954 | Broyles |
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,832,566 A * | 4/1958 | Bielstein | E21B 21/08 175/65 |
| 2,927,775 A | 3/1960 | Hildebrandt |
| 3,016,244 A | 1/1962 | Friedrich et al. |
| 3,028,915 A | 4/1962 | Jennings |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,827,295 A * | 8/1974 | Rochon | E21B 21/08 73/152.22 |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jeambey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,408,486 A * | 10/1983 | Rochon | E21B 21/08 73/152.42 |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,754,641 A * | 7/1988 | Orban | E21B 21/08 73/152.21 |
| 4,817,711 A | 4/1989 | Jearnbey |
| 4,887,464 A | 12/1989 | Tannenbaum et al. |
| 5,037,704 A | 8/1991 | Nakai et al. |
| 5,055,180 A | 10/1991 | Klaila |
| 5,068,819 A | 11/1991 | Misra et al. |
| 5,082,054 A | 1/1992 | Kiamanesh |
| 5,092,056 A | 3/1992 | Deaton |
| 5,107,705 A | 4/1992 | Wraight et al. |
| 5,236,039 A | 8/1993 | Edelstein et al. |
| 5,278,550 A | 1/1994 | Rhein-Knudsen et al. |
| 5,388,648 A | 2/1995 | Jordan, Jr. |
| 5,490,598 A | 2/1996 | Adams |
| 5,501,248 A | 3/1996 | Kiest, Jr. |
| 5,690,826 A | 11/1997 | Cravello |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,958,236 A | 9/1999 | Bakula |
| 6,012,526 A | 1/2000 | Jennings et al. |
| 6,041,860 A | 3/2000 | Nazzal et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,268,726 B1 | 7/2001 | Prammer |
| 6,269,953 B1 | 8/2001 | Seyffert et al. |
| 6,290,068 B1 | 9/2001 | Adams et al. |
| 6,325,216 B1 | 12/2001 | Seyffert et al. |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,544,411 B2 | 4/2003 | Varandaraj |
| 6,561,269 B1 | 5/2003 | Brown et al. |
| 6,607,080 B2 | 8/2003 | Winkler et al. |
| 6,612,384 B1 | 9/2003 | Singh et al. |
| 6,623,850 B2 | 9/2003 | Kukino et al. |
| 6,629,610 B1 | 10/2003 | Adams et al. |
| 6,678,616 B1 | 1/2004 | Winkler et al. |
| 6,722,504 B2 | 4/2004 | Schulte et al. |
| 6,761,230 B2 | 7/2004 | Cross et al. |
| 6,814,141 B2 | 11/2004 | Huh et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,048,051 B2 | 5/2006 | McQueen |
| 7,091,460 B2 | 8/2006 | Kinzer |
| 7,109,457 B2 | 9/2006 | Kinzer |
| 7,115,847 B2 | 10/2006 | Kinzer |
| 7,216,767 B2 | 5/2007 | Schulte et al. |
| 7,312,428 B2 | 12/2007 | Kinzer |
| 7,322,776 B2 | 1/2008 | Webb et al. |
| 7,331,385 B2 | 2/2008 | Symington |
| 7,387,174 B2 | 6/2008 | Lurie |
| 7,445,041 B2 | 11/2008 | O'Brien |
| 7,461,693 B2 | 12/2008 | Considine et al. |

(56) References Cited

U.S. PATENT DOCUMENTS

| | | |
|---|---|---|
| 7,484,561 B2 | 2/2009 | Bridges |
| 7,562,708 B2 | 7/2009 | Cogliandro et al. |
| 7,629,497 B2 | 12/2009 | Pringle |
| 7,631,691 B2 | 12/2009 | Symington et al. |
| 7,650,269 B2 | 1/2010 | Rodney |
| 7,677,673 B2 | 3/2010 | Tranquilla et al. |
| 7,730,625 B2 | 6/2010 | Blake |
| 7,980,392 B2 | 7/2011 | Varco |
| 8,275,549 B2 | 9/2012 | Sabag et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,925,213 B2 | 1/2015 | Sallwasser |
| 8,960,215 B2 | 2/2015 | Cui et al. |
| 9,217,323 B2 | 12/2015 | Clark |
| 9,222,350 B2 | 12/2015 | Vaughn et al. |
| 9,250,339 B2 | 2/2016 | Ramirez |
| 9,435,159 B2 | 9/2016 | Scott |
| 9,464,487 B1 | 10/2016 | Zurn |
| 9,470,059 B2 | 10/2016 | Zhou |
| 9,494,032 B2 | 11/2016 | Roberson et al. |
| 9,528,366 B2 | 12/2016 | Selman et al. |
| 9,731,471 B2 | 8/2017 | Schaedler et al. |
| 9,739,141 B2 | 8/2017 | Zeng et al. |
| 10,174,577 B2 | 1/2019 | Leuchtenberg et al. |
| 10,233,372 B2 | 3/2019 | Ramasamy et al. |
| 10,394,193 B2 | 8/2019 | Li et al. |
| 11,125,075 B1* | 9/2021 | Li .................... E21B 47/047 |
| 2003/0230526 A1 | 12/2003 | Okabayshi et al. |
| 2004/0256103 A1 | 12/2004 | Batarseh |
| 2005/0259512 A1 | 11/2005 | Mandal |
| 2006/0106541 A1 | 5/2006 | Hassan et al. |
| 2006/0144620 A1 | 7/2006 | Cooper |
| 2006/0249307 A1 | 11/2006 | Ritter |
| 2007/0131591 A1 | 6/2007 | Pringle |
| 2007/0137852 A1 | 6/2007 | Considine et al. |
| 2007/0187089 A1 | 8/2007 | Bridges |
| 2007/0204994 A1 | 9/2007 | Wimmersperg |
| 2007/0289736 A1 | 12/2007 | Kearl et al. |
| 2008/0007421 A1 | 1/2008 | Liu et al. |
| 2008/0190822 A1 | 8/2008 | Young |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2010/0089583 A1 | 4/2010 | Xu et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0120732 A1 | 5/2011 | Lurie |
| 2012/0012319 A1 | 1/2012 | Dennis |
| 2012/0037361 A1* | 2/2012 | Santos .................... E21B 21/08 166/250.08 |
| 2012/0132418 A1 | 5/2012 | McClung |
| 2012/0173196 A1 | 7/2012 | Miszewski |
| 2012/0222854 A1 | 9/2012 | McClung, III |
| 2012/0273187 A1 | 11/2012 | Hall |
| 2013/0008653 A1 | 1/2013 | Schultz et al. |
| 2013/0025943 A1 | 1/2013 | Kumar |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0213637 A1 | 8/2013 | Kearl |
| 2014/0083771 A1 | 3/2014 | Clark |
| 2014/0183143 A1 | 7/2014 | Cady et al. |
| 2014/0251894 A1 | 9/2014 | Larson et al. |
| 2014/0278111 A1 | 9/2014 | Gerrie et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0083422 A1 | 3/2015 | Pritchard |
| 2015/0101864 A1 | 4/2015 | May |
| 2015/0211362 A1* | 7/2015 | Rogers .................... E21B 47/12 73/152.22 |
| 2015/0267500 A1 | 9/2015 | Dogen |
| 2015/0290878 A1 | 10/2015 | Houben et al. |
| 2016/0053572 A1 | 2/2016 | Snoswell |
| 2016/0115783 A1 | 4/2016 | Zeng et al. |
| 2016/0247316 A1 | 8/2016 | Whalley et al. |
| 2016/0356125 A1 | 12/2016 | Bello et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0328196 A1 | 11/2017 | Shi et al. |
| 2017/0328197 A1 | 11/2017 | Shi et al. |
| 2017/0342776 A1 | 11/2017 | Bullock et al. |
| 2017/0350201 A1 | 12/2017 | Shi et al. |
| 2017/0350241 A1 | 12/2017 | Shi et al. |
| 2018/0010030 A1 | 1/2018 | Ramasamy et al. |
| 2018/0010419 A1 | 1/2018 | Livescu et al. |
| 2018/0171772 A1 | 6/2018 | Rodney |
| 2018/0265416 A1 | 9/2018 | Ishida et al. |
| 2019/0101872 A1 | 4/2019 | Li |
| 2019/0227499 A1 | 7/2019 | Li et al. |

FOREIGN PATENT DOCUMENTS

| | | |
|---|---|---|
| CN | 107462222 | 12/2017 |
| EP | 2317068 | 5/2011 |
| EP | 2574722 | 4/2013 |
| EP | 2737173 | 6/2014 |
| GB | 2357305 | 6/2001 |
| GB | 2399515 | 9/2004 |
| GB | 2422125 | 7/2006 |
| JP | 2009067609 | 4/2009 |
| JP | 4275896 | 6/2009 |
| JP | 5013156 | 8/2012 |
| WO | 00/25942 | 5/2000 |
| WO | 2068793 | 9/2002 |
| WO | 2009020889 | 2/2009 |
| WO | 2010105177 | 9/2010 |
| WO | 2011038170 | 3/2011 |
| WO | 142622 | 6/2011 |
| WO | 2013016095 | 1/2013 |
| WO | 2013148510 | 10/2013 |
| WO | 2015095155 | 6/2015 |
| WO | 2016178005 | 11/2016 |
| WO | 2017011078 | 1/2017 |

OTHER PUBLICATIONS

"IADC Dull Grading for PDC Drill Bits," Beste Bit, SPE/IADC 23939, 1992, 52 pages.

Ashby et al., "Coiled Tubing Conveyed Video Camera and Multi-Arm Caliper Liner Damage Diagnostics Post Plug and Perf Frac," Society of Petroleum Engineers, SPE-172622-MS, Mar. 2015, pp. 12.

Commer et al., "New advances in three-dimensional controlled-source electromagnetic inversion," Geophys. J. Int., 2008, 172: 513-535.

downholediagnostic.com [online] "Acoustic Fluid Level Surveys," retrieved from URL <https://www.downholediagnostic.com/fluid-level> retrieved on Mar. 27, 2020, available on or before 2018, 13 pages.

Gemmeke and Ruiter, "3D ultrasound computer tomography for medical imagining," Nuclear Instruments and Methods in Physics Research A 580, Oct. 1, 2007, 9 pages.

Halliburton, "Drill Bits and Services Solutions Catalogs," retrieved from URL: <https://www.halliburton.com/content/dam/ps/public/sdbs/sdbs_contents/Books_and_Catalogs/web/DBS-Solution,pdf> on Sep. 26, 2019, Copyright 2014, 64 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

King et al., "Atomic layer deposition of TiO2 films on particles in a fluidized bed reactor," Power Technology, vol. 183, Issue 3, Apr. 2008, 8 pages.

(56) References Cited

OTHER PUBLICATIONS

Liu et al., "Superstrong micro-grained poly crystalline diamond compact through work hardening under high pressure," Appl, Phys. Lett. Feb. 2018, 112: 6 pages.

Ruiter et al., "3D ultrasound computer tomography of the breast: A new era?" European Journal of Radiology 81S1, Sep. 2012, 2 pages.

sageoiltools.com [online] "Fluid Level & Dynamometer Instrumens for Analysis due Optimization of Oil and Gas Wells," retrieved from URL <http://www.sageoiltools.com/>, retrieved on Mar. 27, 2020, available on or before 2019, 3 pages.

Sulzer Metco, "An Introduction to Thermal Spray," Issue 4, 2013, 24 pages.

wikipedia.org [online] "Optical Flowmeters," retireved from URL <https://en.wikipedia.org/wiki/Flow_measurement#Optica_flowmeters>, retrieved on Mar. 27, 2020, available on or before Jan. 2020, 1 page.

wikipedia.org [online] "Ultrasonic Flow Meter," retrieved from URL <https://en.wikipedia.org/wiki/Ultrasonic_flow_meter> retrieved on Mar. 27, 2020, available on or before Sep. 2019, 3 pages.

Zhan et al. "Effect of β-to-α Phase Transformation on the Microstructural Development and Mechanical Properties of Fine-Grained Silicon Carbide Ceramics." Journal of the American Ceramic Society 84.5, May 2001, 6 pages.

Zhan et al. "Single-wall carbon nanotubes as attractive toughening agents in alumina-based nanocomposites." Nature Materials 2.1, Jan. 2003, 6 pages.

Zhan et al., "Atomic Layer Deposition on Bulk Quantities of Surfactant Modified Single-Walled Carbon Nanotubes," Journal of American Ceramic Society, vol. 91, Issue 3, Mar. 2008, 5 pages.

Zhang et al., "Increasing Polypropylene High Temperature Stability by Blending Polypropylene-Bonded Hindered Phenol Antioxidant," Macromolecules, 51(5), pp. 1927-1936, 2018, 10 pages.

\* cited by examiner

WELLBORE FLUID LEVEL MONITORING SYSTEM

TECHNICAL FIELD

This disclosure relates to wellbore operations, for example, operations performed while drilling a wellbore.

BACKGROUND

Hydrocarbons in subsurface reservoirs below the Earth's surface can be produced to the surface by forming wellbores from the surface to the subsurface reservoirs. A wellbore is drilled from the surface to the subsurface reservoir by a wellbore drilling assembly. During drilling, a drilling fluid is flowed from the surface into the wellbore through a drill string and is flowed to the surface out of the wellbore through an annulus formed between an outer surface of the drill string and the wellbore. In some situations, for example, upon encountering a loss circulation zone, the drilling fluid flow to the surface can be lost into the formation being drilled. In such instances, a liquid level in the annulus can drop.

SUMMARY

This disclosure describes technologies relating to a wellbore fluid level monitoring system.

Certain aspects of the subject matter described here can be implemented as a method while drilling a wellbore using a drilling assembly that includes a drill string, a rotary table and a bell nipple below the rotary table. Air flowing in a downhole direction through a portion of an annulus within the bell nipple below the rotary table responsive to a decrease in a liquid level in the portion of the annulus is sensed. The annulus is formed by the drill string and an inner wall of the wellbore. In response to sensing the air flowing in the downhole direction, a flow rate of the air flowing in the downhole direction over a period of time is measured. Based on the flow rate and the period of time, a volume of air flowed in the downhole direction over the period of time is determined. A liquid level relative to the rotary table is determined based on the volume of air flowed in the downhole direction over the period of time.

An aspect combinable with any other aspect includes the following features. To determine the liquid level relative to the rotary table based on the volume of air flowed in the downhole direction over the period of time, a flow rate of the air flowing in a downhole direction is computationally determined in a computational wellbore having identical computational features as the wellbore. A computational liquid level relative to a computational rotary table is determined based on the computationally determined flow rate of the air flowed in a computational downhole direction over the period of time.

An aspect combinable with any other aspect includes the following features. A computational model of the computational wellbore is generated. The computational model includes a computational drill string, the computational rotary table and a computational bell nipple below the computational rotary table.

An aspect combinable with any other aspect includes the following features. The computational model is a finite element model.

An aspect combinable with any other aspect includes the following features. A distance between a location in the portion of the annulus at which the air flowing is sensed and the computational drill string is received as an input to the computational model. The computationally determined flow rate of the air flowing in the downhole direction is generated using the input.

An aspect combinable with any other aspect includes the following features. An air sensor is installed in the portion of the annulus within the bell nipple below the rotary table to sense the air flow in the downhole direction.

An aspect combinable with any other aspect includes the following features. It is determined that the portion of the annulus within the bell nipple is filled at least partially with a liquid. The air sensor is sealed from the liquid responsive to determining that the portion of the annulus within the bell nipple is filled at least partially with the liquid.

Certain aspects of the subject matter described here can be implemented as a non-transitory, computer-readable medium storing instructions executable by one or more processors to perform operations described here.

Certain aspects of the subject matter described here can be implemented as a system. The system includes an air flow sensor and a computer system. The air flow sensor is configured to be installed in a portion of an annulus within a bell nipple below a rotary table of a wellbore drilling assembly. The air flow sensor is configured to perform operations including sensing air flow in a downhole direction through the portion of an annulus within the bell nipple below the rotary table responsive to a decrease in a liquid level in the portion of the annulus, and transmitting signals representing the sensed air. The annulus is formed by the drill string and an inner wall of the wellbore. The computer system includes one or more processors and a computer-readable medium storing instructions executable by the one or more processors to perform operations described here.

Certain aspects of the subject matter described here can be implemented as a sealing system. The sealing system includes a housing, a first sealing element, a second sealing element and a sealing unit. The housing is configured to be securely disposed in a portion of an annulus within a bell nipple below a rotary table of a wellbore drilling assembly. The annulus is formed by a drill string of the wellbore drilling assembly and an inner wall of a wellbore being drilled by the wellbore drilling assembly. The housing includes a first open end and a second open end. The housing is configured to house an air flow sensor disposed within the housing. The first sealing element is attached to the first open end of the housing. The first sealing element is configured to seal and unseal the first open end. The second sealing element is attached to the second open end of the housing. The second sealing element is configured to seal and unseal the second open end. The sealing unit is disposed in the portion of the annulus. The sealing unit is connected to the housing, the first sealing element and the second sealing element. The sealing unit is configured to actuate the first sealing element and the second sealing element to seal or unseal the first open end and the second open end, respectively, based on a liquid level in the portion of the annulus.

An aspect combinable with any other aspect includes the following features. The sealing unit includes a floating member configured to float in a liquid in the portion of the annulus. The floating member is connected to the first sealing element and the second sealing element. The floating member is configured to travel in a downhole direction as the liquid level falls in the portion of the annulus and to travel in an uphole direction as the liquid level rises in the portion of the annulus.

An aspect combinable with any other aspect includes the following features. The floating member is configured to actuate each of the first sealing element and the second sealing element to unseal the first open end and the second open end, respectively, responsive to the floating member traveling in the downhole direction and to seal the first open end and the second open end, respectively, responsive to the floating member traveling in the uphole direction.

An aspect combinable with any other aspect includes the following features. The sealing unit includes a gear bar connected to the floating member, the housing, the first sealing element and the second sealing element. The gear bar is configured to cause the first sealing element and the second sealing element to seal or unseal the first open end and the second open end, respectively, responsive to the floating member traveling in the uphole direction or the downhole direction, respectively.

An aspect combinable with any other aspect includes the following features. A first gear is connected to an end of the first sealing element and to the gear bar. The first gear is configured to pivot the first sealing element about the end responsive to a movement of the floating member.

An aspect combinable with any other aspect includes the following features. A second gear is connected to an end of the second sealing element and to the gear bar. The second gear is configured to pivot the second sealing element about the end responsive to a movement of the floating member.

An aspect combinable with any other aspect includes the following features. A reverse gear is connected to the second gear and to the gear bar. The reverse gear is connected between the second gear and the end of the second sealing element. The reverse gear is configured to pivot the second sealing element in a direction opposite a direction in which the first gear pivots the first sealing element.

An aspect combinable with any other aspect includes the following features. The air flow sensor is disposed within the housing. The air flow sensor is configured to sense air flowed through the first open end and the second open end of the housing responsive to the sealing unit unsealing the first open end and the second open end based on the liquid level in the portion of the annulus falling below a position of the housing in the portion of the annulus.

Certain aspects of the subject matter described here can be implemented as a method. Open ends of a housing securely disposed in a portion of an annulus within a bell nipple below a rotary table of a wellbore drilling assembly are sealed. The annulus is formed by a drill string of the wellbore drilling assembly and an inner wall of a wellbore being drilled by the wellbore drilling assembly. An ad flow sensor is disposed within the housing. At least a portion of the housing contacts a liquid in the portion of the annulus. In response to a liquid level in the portion of the annulus falling below at least the portion of the housing, the open ends of the housing are unsealed. Air flowed through the open ends of the housing caused by the falling of the liquid level is sensed by the air flow sensor.

An aspect combinable with any other aspect includes the following features. To seal the open ends of the housing, an end of a first sealing element is attached to a first open end of the open ends of the housing. An end of a second sealing element is attached to a second open end of the open ends of the housing. The first sealing element and the second sealing element pivot about the respective ends from an unsealed position to a sealed position.

An aspect combinable with any other aspect includes the following features. To unseal the open ends of the housing, the first sealing element and the second sealing element pivot from the sealed position to the unsealed position.

An aspect combinable with any other aspect includes the following features. The housing, the first sealing element and the second sealing element are connected to a sealing unit disposed in the portion of the annulus. To seal the open ends of the housing or unseal the open ends of the housing, the sealing unit actuates the first sealing element and the second sealing element to seal or unseal, respectively, the first sealing element and the second sealing element to the open ends.

An aspect combinable with any other aspect includes the following features. The sealing unit includes a floating member configured to float in the liquid in the portion of the annulus. The floating member travels in an uphole direction within the annulus to seal the first sealing element and the second sealing element to the open ends of the housing stop the floating member travels in a downhole direction within the annulus to unseal the first sealing element and the second sealing element to the open ends of the housing.

An aspect combinable with any other aspect includes the following features. After the air flow sensor senses the air flowed through the open ends of the housing, the open ends of the housing are re-sealed in response to the liquid level in the portion of the annulus rising to at least the portion of the housing.

Certain aspects of the subject matter described here can be implemented as a system. The system includes a housing, an air flow sensor, a first sealing element, a second sealing element and a sealing unit. The housing is configured to be securely disposed in a portion of an annulus within a bell nipple below a rotary table of a wellbore drilling assembly. The annulus is formed by a drill string of the wellbore drilling assembly and an inner wall of a wellbore being drilled by the wellbore drilling assembly. The housing includes a hollow internal chamber. The air flow sensor is disposed within the hollow internal chamber. The air flow sensor is configured to sense flow of air through the hollow internal chamber. The first sealing element is attached to a first end of the housing. The second sealing element is attached to a second end of the housing. The sealing unit is disposed in the portion of the annulus. The sealing unit is connected to the housing, the first sealing element and the second sealing element. The sealing unit is configured to seal or unseal the first end and the second end using the first sealing element and the second sealing element, respectively, based on a liquid level in the portion of the annulus.

An aspect combinable with any other aspect includes the following features. The sealing unit includes a floating member less dense than a liquid in the portion of the annulus. The floating member is configured to sink within the portion of the annulus as the liquid level falls in the portion of the annulus and to rise within the portion of the annulus with the liquid as the liquid level rises in the portion of the annulus.

An aspect combinable with any other aspect includes the following features. The floating member is configured to actuate each of the first sealing element and the second sealing element to unseal the first open end and the second open end, respectively, responsive to the floating member traveling in the downhole direction and to seal the first open end and the second open end, respectively, responsive to the floating member traveling in the uphole direction.

Certain aspects of the subject matter described here can be implemented as a system. The system includes a housing, a pair of covers and an actuation unit. The housing is configured to be securely disposed in the portion of an annulus within a bell nipple below a rotary table of a wellbore drilling assembly. The annulus is formed by a drill string of the wellbore drilling assembly and an inner wall of a wellbore being drilled by the wellbore drilling assembly. The housing is configured to house an air flow sensor disposed within the housing. The pair of covers are attached to a respective pair of ends of the housing. The pair of covers are configured to sealingly cover and uncover the pair of ends. The actuation unit is disposed in the portion of the annulus. The actuation unit is connected to the housing and the pair of covers. The actuation unit is configured to actuate the pair of covers to cover or uncover the pair of ends, respectively, based on a liquid level in the portion of the annulus.

An aspect combinable with any other aspect includes the following features. The actuation unit includes a pair of liquid sensors configured to be disposed in the annulus downhole of the housing and to be axially spaced apart from each other. Each liquid sensor is configured to transmit a signal upon contacting a liquid.

An aspect combinable with any other aspect includes the following features. The pair of liquid sensors is operatively coupled to the pair of covers. The pair of covers is configured to cover or uncover the pair of ends responsive to signals transmitted by the pair of liquid sensors upon contacting the liquid.

An aspect combinable with any other aspect includes the following features. The pair of liquid sensors includes a first liquid sensor and a second liquid sensor. The pair of covers are configured to close responsive to the first liquid sensor contacting the liquid. The pair of covers are configured to open responsive to the second liquid sensor contacting the liquid.

An aspect combinable with any other aspect includes the following features. The pair of covers are a pair of motorized covers.

An aspect combinable with any other aspect includes the following features. The air flow sensor is disposed within the housing. The air flow sensor is configured to sense air flowed through the pair of ends of the housing responsive to the actuation unit uncovering the pair of ends based on the liquid level in the portion of the annulus falling below a position of the housing in the portion of the annulus.

Certain aspects of the subject matter described here can be implemented as a method. Ends of a housing securely disposed in a portion of an annulus within a bell nipple below a rotary table of a wellbore drilling assembly are covered. The annulus is formed by a drill string of the wellbore assembly and an inner wall of a wellbore being drilled by the wellbore drilling assembly. An air flow sensor is disposed within the housing. At least a portion of the annulus is filled with a liquid. In response to a liquid level in the portion of the annulus falling below a pre-determined well location within the annulus, the ends of the housing are uncovered. Air flowed through the housing caused by the falling of the liquid level is sensed by the air flow sensor.

An aspect combinable with any other aspect includes the following features. To cover the ends of the housing, an end of a first cover is attached to a first end of the ends of the housing. An end of a second cover is attached to a second end of the ends of the housing. The first cover and the second cover are pivoted about the respective ends from an uncovered position to a covered position.

An aspect combinable with any other aspect includes the following features. To uncover the ends of the housing, the first cover and the second cover are pivoted from the uncovered position to the covered position.

An aspect combinable with any other aspect includes the following features. The housing, the first cover and the second cover are connected to an actuation unit disposed in the portion of the annulus. To cover the ends of the housing or uncover the ends of the housing, the actuation unit actuates the first cover and the second cover to cover or uncover, respectively, the first cover and the second cover to the ends.

An aspect combinable with any other aspect includes the following features. The actuation unit includes a pair of liquid sensors configured to be disposed in the annulus downhole of the housing and to be axially spaced apart from each other. Each liquid sensor is configured to transmit a signal upon contacting a liquid. The pair of covers includes a pair of motors, respectively. For the actuation unit to actuate the first cover and the second cover to cover the ends, a first liquid sensor of the pair of liquid sensors sensors, a liquid presence responsive to the liquid contacting the first liquid sensor. The first liquid sensor transmits a signal responsive to sensing the liquid presence.

An aspect combinable with any other aspect includes the following features. The pair of motors receives the signal from the first liquid sensor. The pair of motors actuates the pair of covers to cover the ends of the housing responsive to receiving the signal from the first liquid sensor.

An aspect combinable with any other aspect includes the following features. For the actuation unit to actuate the first cover and the second cover to uncover the ends, a second liquid sensor of the pair of liquid sensors, senses, a liquid absence responsive to the liquid ceasing to contact the second liquid sensor, and transmits a signal responsive to sensing the liquid absence.

An aspect combinable with any other aspect includes the following features. The pair of motors receives the signal from the second liquid sensor, and actuates the pair of covers to uncover the ends of the housing responsive to receiving the signal from the second liquid sensor.

An aspect combinable with any other aspect includes the following features. After the air flow sensor senses the air flowed through the ends of the housing, the ends of the housing are re-covered in response to the liquid level in the portion of the annulus rising to at least the pre-determined well location within the annulus.

Certain aspects of the subject matter described here can be implemented as a system. The system includes a housing, an air flow sensor, a first cover, a second cover, and an actuation unit. The housing is configured to be securely disposed in a portion of an annulus within a bell nipple below a rotary table of a wellbore drilling assembly. The annulus is formed by a drill string of the wellbore drilling assembly and an inner wall of a wellbore being drilled by the wellbore drilling assembly. The housing includes a hollow internal chamber. The air flow sensor is disposed within the hollow internal chamber. The air flow sensor is disposed within the hollow internal chamber. The air flow sensor is configured to sense flow of air through the hollow internal chamber. The first cover is attached to a first end of the housing. A second cover is attached to a second end of the housing. The actuation unit is disposed in the portion of the annulus. The actuation unit is connected to the housing, the first cover and the second cover. The actuation unit is configured to actuate the first cover and the second cover to cover or uncover the first end and the second end, respectively, based on a liquid level in the portion of the annulus.

An aspect combinable with any other aspect includes the following features. The actuation unit includes a pair of liquid sensors configured to be disposed in the annulus downhole of the housing and to be axially spaced apart from each other. Each liquid sensor is configured to transmit a signal upon contacting a liquid.

An aspect combinable with any other aspect includes the following features. The pair of liquid sensors includes a first liquid sensor disposed in the portion of the annulus downhole of the housing. The actuation unit is configured to actuate the first cover and the second cover to cover the first end and the second end, respectively, responsive to the liquid level in the portion of the annulus being at or above a location of the first liquid sensor.

An aspect combinable with any other aspect includes the following features. The pair of liquid sensors includes a second liquid sensor disposed in the portion of the annulus downhole of the housing. The actuation unit is configured to actuate the first cover and the second cover to uncover the first end and the second end, respectively, responsive to the liquid level in the portion of the annulus being at or below a location of the second liquid sensor.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
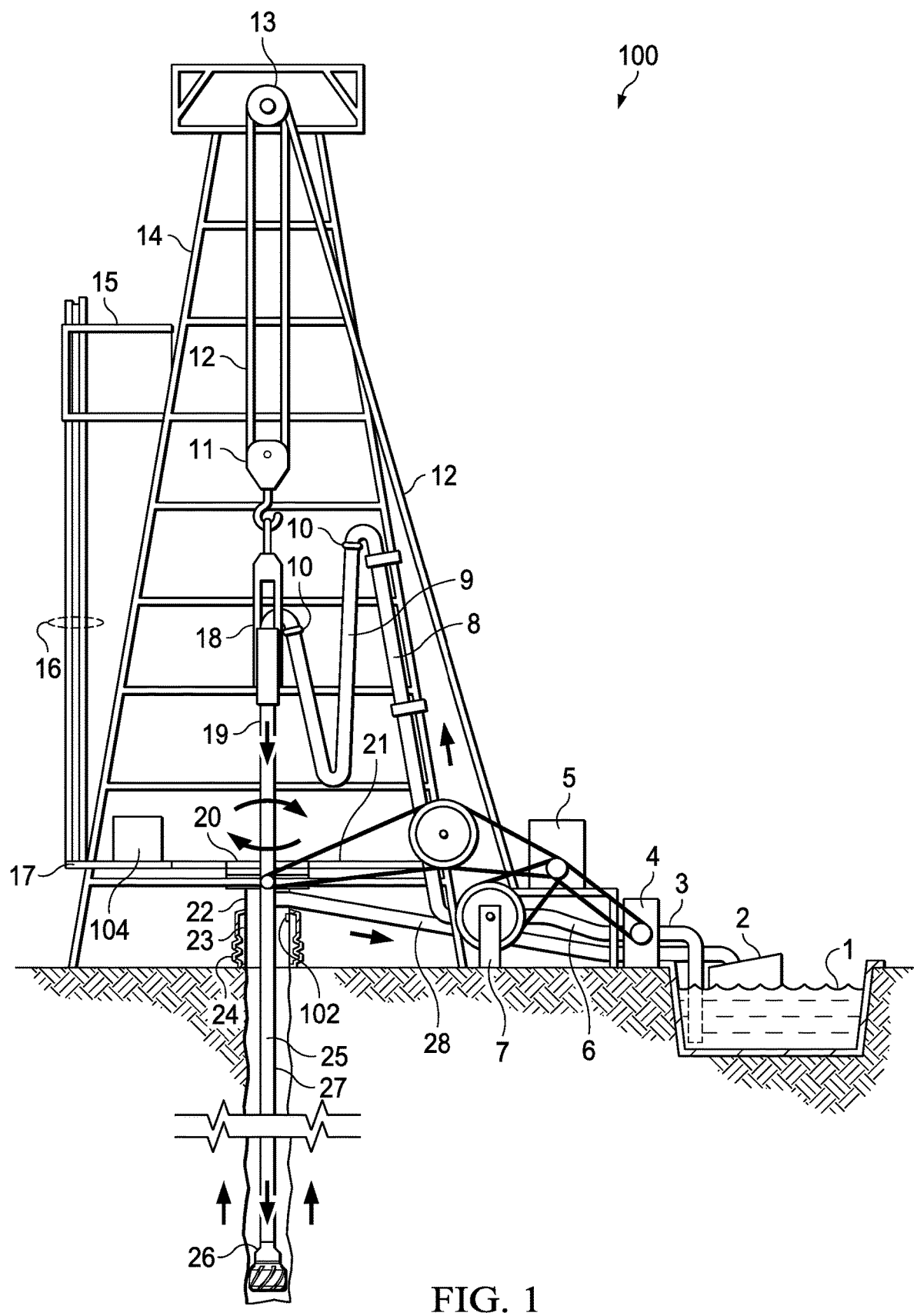
FIG. 1 is a schematic diagram of a wellbore drilling assembly that includes an air flow sensor operatively coupled to a computer system.

This disclosure describes technologies relating to determining fluid level in an annulus surrounding a drill string, in particular, when drilling fluid is being lost in a loss circulation zone. The disclosure covers several implementations. In some implementations, during loss circulation (that is, loss of drilling fluid into a loss circulation zone) flow of gas (for example, air) is measured past a sensor (for example, a gas sensor) installed inside a bell nipple below the rotary of the drilling assembly. A finite element method (FEM) simulation is performed to determine effective gas flow speed versus measured gas flow speed in the region through which the gas flows. The resulting data is used to determine a fluid level in the annulus. In some implementations, because the gas sensor is a dry gas sensor, the gas sensor is sealed within an enclosure that can be opened or closed by a wet sensor. When fluid is not lost in the loss circulation zone, the wet sensor keeps the enclosure closed and prevents fluid from contacting or damaging the gas sensor. When fluid is lost in the loss circulation zone and the liquid level in the annulus drops below the location of the sensor in the annulus, the wet sensor causes the enclosure to open and allows the gas sensor to measure the gas flow speed. In some implementations, a mechanical arrangement is used to open or close the enclosure that seals the gas sensor. In some implementations, an electrical arrangement is used to open or close the enclosure that seals the gas sensor. Further implementations include an ultrasonic flow meter or an optics-based gas flow meter that measures dry gas and wet gas flow and that does not require the enclosure for sealing.

The enclosure to house the gas sensor and the arrangements to open or close the enclosure based on contact with a liquid are described with reference to liquid level in an annulus formed by a drill string of a drilling assembly and an inner wall of a wellbore being drilled by the drilling assembly. Nevertheless, the enclosure and the arrangements can be implemented in any environment in which a dry gas sensor needs to be isolated from liquids and be available to sense the presence of or flow of gas or measure gas flow speed only when the dry gas sensor does not contact the liquid, for example, when the liquid level drops below a location of the dry gas sensor.

Implementing the techniques described in this disclosure can allow using acoustic telemetry to obtain real-time drilling and completion data in previously unavailable environments without depth, fluid flow or stratigraphic constraints. Doing so can maximize operational efficiency and reduce costs in different ways. The wellbore liquid level monitoring system described here can be implemented as a fluid level device to determine the fluid level in the wellbore during loss circulation situations. The integrity and safety requirements of the wellbore can be improved by accurate detection of the fluid level in the wellbore, for example, in the annulus described earlier.

FIG. 1 is a schematic diagram of a wellbore drilling assembly 100 that includes an air flow sensor 102 operatively coupled to a computer system 120. A mud tank 1 carries wellbore drilling fluid (sometimes called mud or drilling mud). Shale shakers 2 separate debris removed from the formation during drilling (for example, wellbore cuttings, rocks, other debris) from the wellbore drilling fluid before flowing the fluid back to the mud tank 1 after drilling. A suction line 3 is an intake line for a mud pump 4 to draw the wellbore drilling fluid from the mud tank 1. A motor 5 or other power source is used to spin a drill bit 26 independently from the rest of a drill string 25. A vibrating hose 6 is a flexible, high pressure hose that connects the mud pump to a stand pipe. Draw works 7 is the mechanical section that contains the spool which reels in or out a drill line 12 to raise or lower a traveling block 11. A standpipe 8 is a thick metal tubing situated vertically along a derrick 14. A goose neck 10 is a thick metal elbow connected to a swivel 18 (top end of the kelly that allows the rotation of the drill string without twisting the block) and standpipe to support the weight of and provide a downward angle for the kelly hose to hang from. A crown block 13 is the stationary end of a block and tackle. The derrick 14 is the support structure for the equipment used to lower and raise the drill string into and out of the wellbore. The monkey board 15 is the catwalk along the side of the derrick 14. A stand 16 is a section of joints of drill pipe connected and stood upright in the derrick 14. A setback 17 is a part of the drill floor 21 where the stands of drill pipe are stood upright. A kelly 9 is a flexible, high pressure hose that connects the standpipe to the kelly. A kelly drive 19 is a tubing that is inserted through and is a part of a rotary table 20 that moves freely vertically while the rotary table 20 turns. A bell nipple 22 is a section of large diameter pipe fitted to the top of blowout preventers 23, 24 that the flow line 28 attaches to via a side outlet to allow the drilling mud to flow back to the mud tanks. Drill string 25 is an assembled collection of drill pipe, heavy weight drill pipe, drill collars and other tools connected and run into the wellbore to facilitate drilling the well. A casing head 27 is a metal flange attached onto the top of the conductor pipe or the casing and used to bolt the surface equipment such as the blowout preventers.

In some implementations, the wellbore drilling assembly 100 includes an air flow sensor 102 operatively coupled to a computer system 104. For example, the air flow sensor 102 and the computer system 104 can be coupled via wires. The computer system 104 can perform computational work (described later) at the surface responsive to receiving, through the wire, data sensed by the air flow sensor 102. In another example, the computer system 104 can be integrated with the air flow sensor 102 and installed at the bell nipple. In such examples, power can be supplied to the computer system 104 via a power and data cable that can also retrieve results of the computational work to the surface. For example, the air flow sensor 102 is an orifice flow meter, vortex shedding flow meter, a turbine flow meter that only senses dry gas, or similar air flow sensor. The air flow sensor 102 is configured to sense the presence of gas and to transmit a signal, for example, an electrical signal or a data signal or both, representing the presence of the gas. The air flow sensor 102 is, alternatively or in addition, configured to measure a flow speed (for example, in meters per second or equivalent unit of speed) of gas past the sensor 102 and to transmit a signal, for example, an electrical signal or a data signal or both, representing the flow speed.

In some implementations, the air flow sensor 102 operates only in the presence of the gas (for example, air). In such implementations, the air flow sensor 102 does not operate in the presence of liquid. Also, in such implementations, the air flow sensor 102 is enclosed in an airtight housing (described later) that keeps the air flow sensor 102 dry at all times. As described later, in some implementations, the air flow sensor operates in the presence of gas or liquid. In such implementations, the airtight housing is unnecessary.

In some implementations, the wellbore drilling assembly 100 includes a computer system 104 that is operatively coupled to the air flow sensor 102. The computer system 104 is configured to receive signals generated by the air flow sensor 102 responsive to sensing the presence of the gas or measuring the flow speed of the gas past the air flow sensor 102, or both. The computer system 104 includes one or more processors and a computer-readable medium (for example, a non-transitory, computer-readable medium) storing computer instructions executable by the one or more processors to perform operations described in this disclosure. For example, the computer system 104 can determine a liquid level within an annulus formed by an outer wall of the drill string and an inner wall of the wellbore based on signals received from the air flow sensor 102.

Figure 2A:
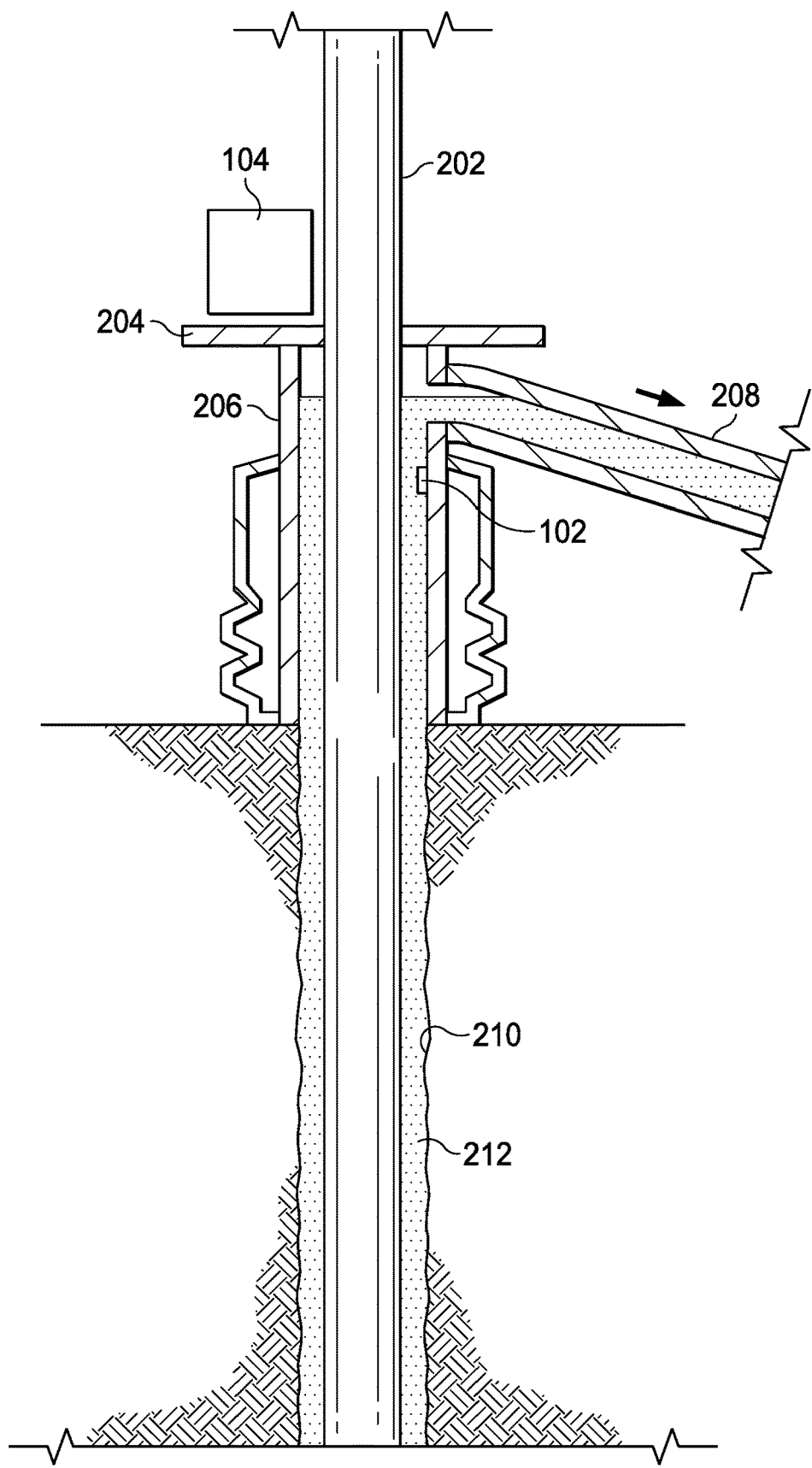
FIG. 2A is a schematic diagram of a liquid level in the annulus being uphole of the air flow sensor.
Figure 2B:
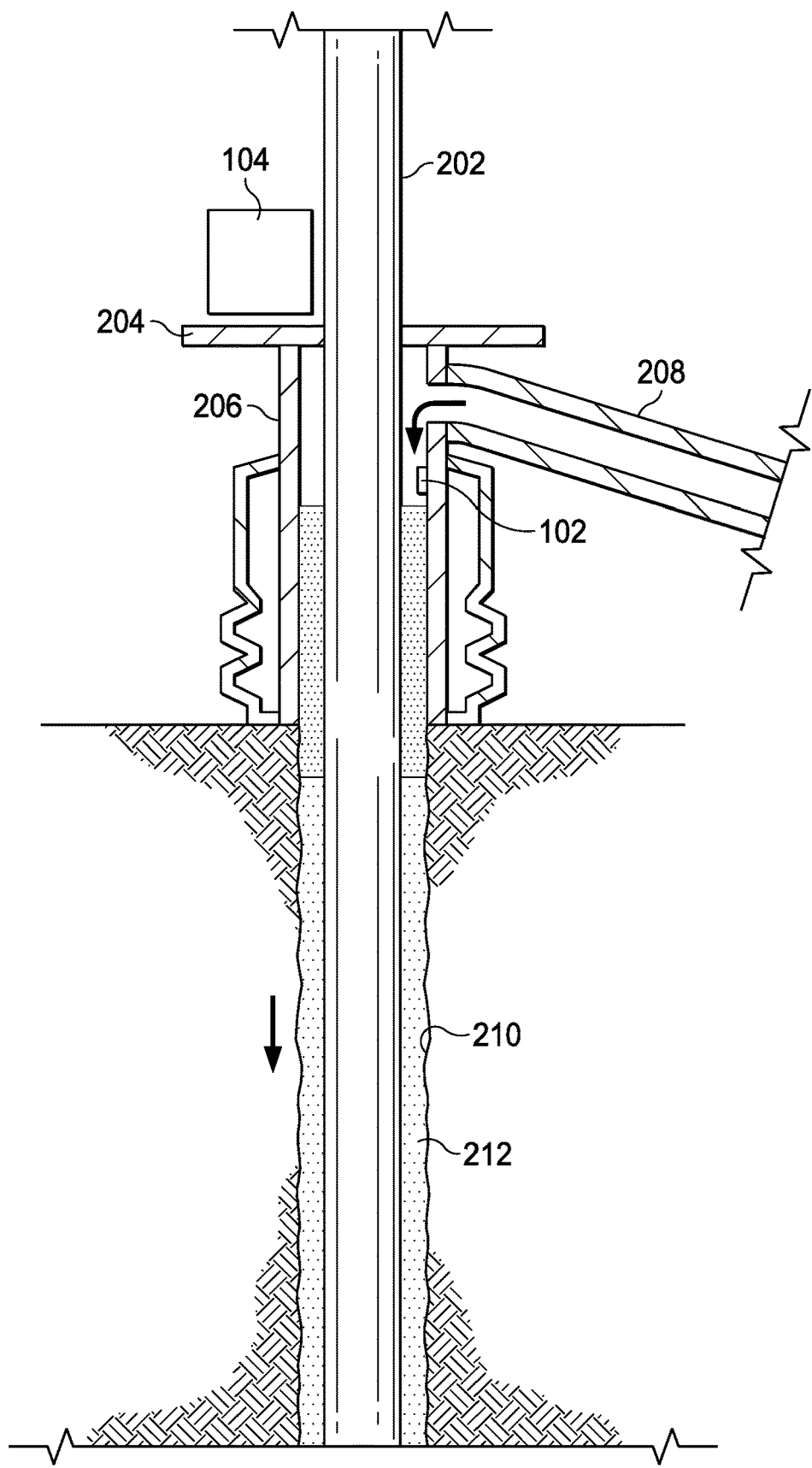
FIG. 2B is a schematic diagram of a liquid level in the annulus being downhole of the air flow sensor.

FIG. 2A is a schematic diagram of a liquid level in the annulus being uphole of the air flow sensor. FIG. 2B is a schematic diagram of a liquid level in the annulus being downhole of the air flow sensor. As described earlier with reference to FIG. 1, positioning the drill string 202 inside the wellbore 210 forms an annulus 212 between an outer wall of the drill string 200 and to and an inner wall of the wellbore 210. The wellbore drilling fluid is flowed downhole into the wellbore through the drill string 202 flows to the surface through the annulus 212 and out of the wellbore through the flowline 208. In some implementations, the air flow sensor 102 is disposed in the bell nipple 206 below the rotary table 204. The bell nipple 206 is selected as the location in which the air flow sensor 102 is disposed due to its location above the blowout preventer which is less likely to cause safety concern and its large inner diameter which is convenient for installing one or more air flow sensors. In some implementations, the computer system 104 is disposed above the rotary table 204. Alternatively, the computer system 104 can be disposed at a different location about the surface of the wellbore 210 or at a remote location away from the well site.

In the configuration shown in FIG. 2A, the wellbore drilling fluid flows in an uphole direction through the annulus 212 and out of the flowline 208. Consequently, no air flows past the air flow sensor 102. In the configuration shown in FIG. 2B, the wellbore drilling fluid in the annulus 212 is flowing in a downhole direction, that is, opposite the flow direction in the configuration shown in FIG. 2A. The reversal in flow direction can be due to the wellbore drilling fluid being lost to a loss circulation zone (not shown) at a downhole location in the formation. In such instances, as the direction of flow of the wellbore drilling fluid reverses, the liquid in the flowline 208 is drawn in the downhole direction and the liquid level in the annulus 212 drops. The drop in the liquid level causes the annular region surrounding the air flow sensor 102 to become liquid-free. Also, the drop in the liquid level creates a negative pressure in the annular region surrounding the air flow sensor 102. The air flow sensor 102 can either sense a presence of the air in the surrounding annular region or can measure a flow speed of the air due to the negative pressure, or both. In some implementations, the air flow sensor 102 generates signals representing the presence of the air or the measured flow speed (or both) and transmit the signals to the computer system 104.

The computer system 104 can receive the signals from the air flow sensor 102. The air flow sensor 102 can transmit the signals at a frequency, for example, one signal per second, 0.1 Hertz (Hz) or greater, or lower frequency. The computer system 104 can associate a timestamp at which each signal is received from the air flow sensor 102. In this manner, the computer system 104 can receive signals from the air flow sensor 102 over a period of time. The computer system 104 can determine a volume of air that flows past the air flow sensor 102 over the period of time. To do so, in some implementations, the computer system 104 can generate a plot of air flow speed (Y-axis) versus time (X-axis). Integrating the area under the plot of flow speed versus time yields the volume of air (V) that flows past the air flow sensor 102 over the period of time.

Having determined the volume of air (V), the computer system 104 can determine a liquid level (L) by executing Equation 1:

$$V = \left(\frac{\pi}{4}\right)\int_0^L (ID(L)^2 - OD(L)^2)dL \quad \text{(Equation 1)}$$

In Equation 1, V is the determined volume of air that flows past the air flow sensor 102 over the period of time. OD(L) is the outer diameter of the drill string 202 as a function of the position L of the drill string 202. ID(L) is the inner diameter of the annulus 212 as a function of the position L at the annulus 212 from the surface. LD is the depth of the casing shoe. L is the fluid depth. Also, in Equation 1, ID=ID of the casing when L<LD, and ID=ID of the open hole when L>=LD.

Figure 3:
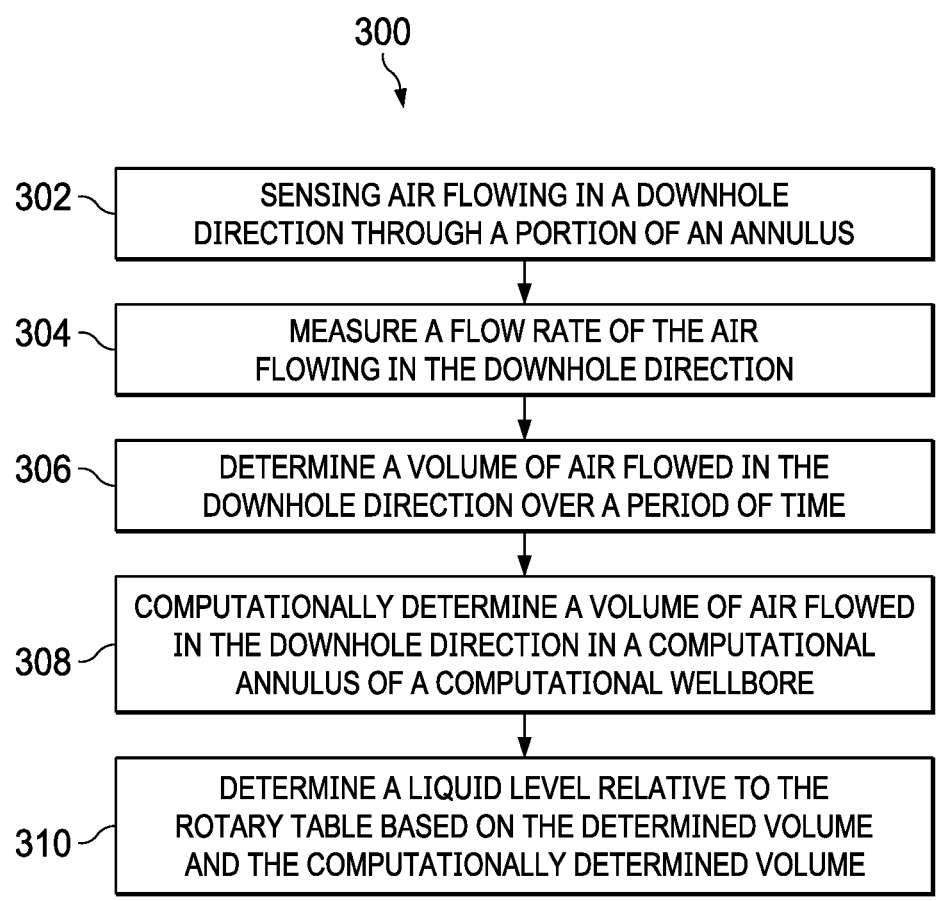
FIG. 3 is a flowchart of an example of a process of determining a liquid level in the annulus.

In some implementations, the computer system 104 can determine an effective air flow speed by finite element analysis (FEM) performed on a computational wellbore with the same structure of bell nipple and sensor assembly as the real world wellbore. To do so, in some implementations, the computer system 104 can generate a computational wellbore having identical computational features as the wellbore being drilled, that is, the wellbore schematically shown in FIGS. 2A and 2B. The computer system 104 can generate a computational wellbore drilling assembly having identical computational features as the wellbore drilling assembly being used to drill the wellbore schematically shown in FIGS. 2A and 2B. As input, the computer system 104 can receive computational values identical to the signals generated by the air flow sensor 102. Also, the computer system 104 receives as input, the distance from the sensor to the drill string as well as an inner diameter of a circle formed by the sensors' measurement plane. By performing the FEM analysis on the received input, the computer system 104 can determine an effective air flow speed, which is an approximation of the actual air flow speed. As described later, an accuracy of the effective air flow speed can be improved by deploying multiple sensors around the bell nipple and increasing the density of the finite element mesh size for the FEM analysis. Having determined the effective air flow speed, the computer system 104 can determine a computational liquid level relative to the computational rotary table, for example, by executing Equation 1. c FIG. 3 is a flowchart of an example of a process 300 of determining a liquid level in the annulus. The process 300 can be executed in part by the air flow sensor 102 and in part by the computer system 104. Also, the computer system 104 can execute the process 300 while a wellbore drilling assembly is drilling a wellbore. As described earlier, the drilling assembly includes a drill string, a rotary table and a bell nipple below the rotary table. At 302, air flowing in a downhole direction through a portion of an annulus within the bell nipple below the rotary table is sensed. The airflows in the downhole direction responsive to a decrease in the liquid level in the portion of the annulus. The annulus is formed by the drill string and the inner wall of the wellbore. At 304, a flow rate of the air flowing in the downhole direction is measured over the period of time. At 306, a volume of air flowed in the downhole direction over the period of time is determined based on the flow rate and the period of time. At 308, a volume of air flowed in the downhole direction of a computational annulus of a computational wellbore is computationally determined, for example, by implementing the FEM analysis described earlier. At 310, a liquid level relative to the rotary table is determined based on the volume of air flowed in the downhole direction over the period of time.

In some implementations, the computer system 104 can be connected to a display device (not shown), for example, a computer monitor. The computer system 104 can display, in the computer monitor, the liquid level, for example, in a user interface. Also, the computer system 104 can display, in the computer monitor, the plot of the air flow speed versus the period of time. In some implementations, the computer system 104 can display this information in real-time. For the purposes of this disclosure, the term real-time (as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data. Real-time display of the information can be affected by the data sampling frequency of the air flow sensor 102 and a time delay in transmitting the sample data from the air flow sensor 102. The computer system 104.

Knowing the liquid level in the annulus allows a drilling assembly operator to perform certain operations. For example, a drop in the liquid level in the annulus is an indication that the drilling fluid is being lost into a loss circulation zone. In response, the drilling assembly operator can pump drilling fluid directly from the annulus side as well as initiate operations to counter the loss circulation. Implementing the techniques described here can also provide a way to monitor the effectiveness of the lost circulation mitigation techniques in real-time.

As described earlier, in some implementations, the air flow sensor 102 is a dry gas sensor that does not operate in the presence of liquid. In such implementations, the air flow sensor 102 can be sealed inside an airtight housing disposed in the annulus 212. The housing is sealed and remains airtight when the liquid level in the annulus 212 is at or above a predetermined level, for example, at the level of the housing. In such situations, the air flow sensor 102 either does not sense the presence or flow of air through the annulus 212 or any signals received from the air flow sensor 102 are ignored by the computer system 104. When the liquid level in the annulus 212 drops below the predetermined level, the housing is unsealed, allowing the air to flow through the housing and past the air flow sensor 102. In such situations, the air flow sensor senses the presence or flow of air through the housing and transmits representative signals to the computer system 104 as described earlier. Details describing unsealing or sealing the housing based on the liquid level in the annulus in which the housing is disposed are described with reference to the following figures.

FIGS. 4A-4H are schematic diagrams of different stages of a mechanical arrangement to expose an air flow sensor to air flowing through the annulus. The mechanical arrangement can be implemented as a sealing system that can prevent exposure of the air flow sensor 102 to liquid in the annular region surrounding the air flow sensor 102 and permit exposure only when the annular region is liquid-free. The sealing system includes a housing 302 configured to be securely disposed in a portion of an annulus within the bell nipple below the rotary table of the wellbore drilling assembly. For example, the housing 302 is configured to be securely disposed in the same region in which the air flow sensor 102 is disposed in the annulus 212 within the bell nipple 206 below the rotary table 204. In some implementations, the housing 302 can be an elongated, hollow, tubular member of any cross-section, for example, circular rectangular or similar cross-section. The housing 302 can be made of any material that can withstand the drilling environment in which the housing 302 is disposed.

The ends (for example, an uphole end and a downhole end) of the housing 302 are open. As a result, the ends of the housing 302 permit fluid to flow within an internal volume defined by the housing 302. An air flow sensor, for example, the air flow sensor 102 can be disposed within the internal volume defined by the housing 302. The data/power cable can run through the housing and the bell nipple casing or extend upwards and run through the flow line pipe. When the liquid level in the annulus 212 defined by an outer wall of the drill pipe 202 and an inner wall of the wellbore 210 drops below a pre-determined level, for example, a downhole end 306 of the housing 302, then air that flows downhole through the annular region, flows through the internal volume defined by the housing 302. The pre-determined level is defined by the fluid level that changes between fully submerging the sensor and exposing the sensor. The float mechanism is calibrated in a way that the two fluid levels control the float to open and close the upper and lower sealing as need be. In such instances, the air flow sensor 102 performs operations described earlier. However, when the liquid level in the annulus 212 is above the pre-determined level, then the sealing system prevents the airflow sensor 102 from being exposed to the liquid in the annular region surrounding, that is, uphole and downhole of, the housing 302.

Figure 4A:
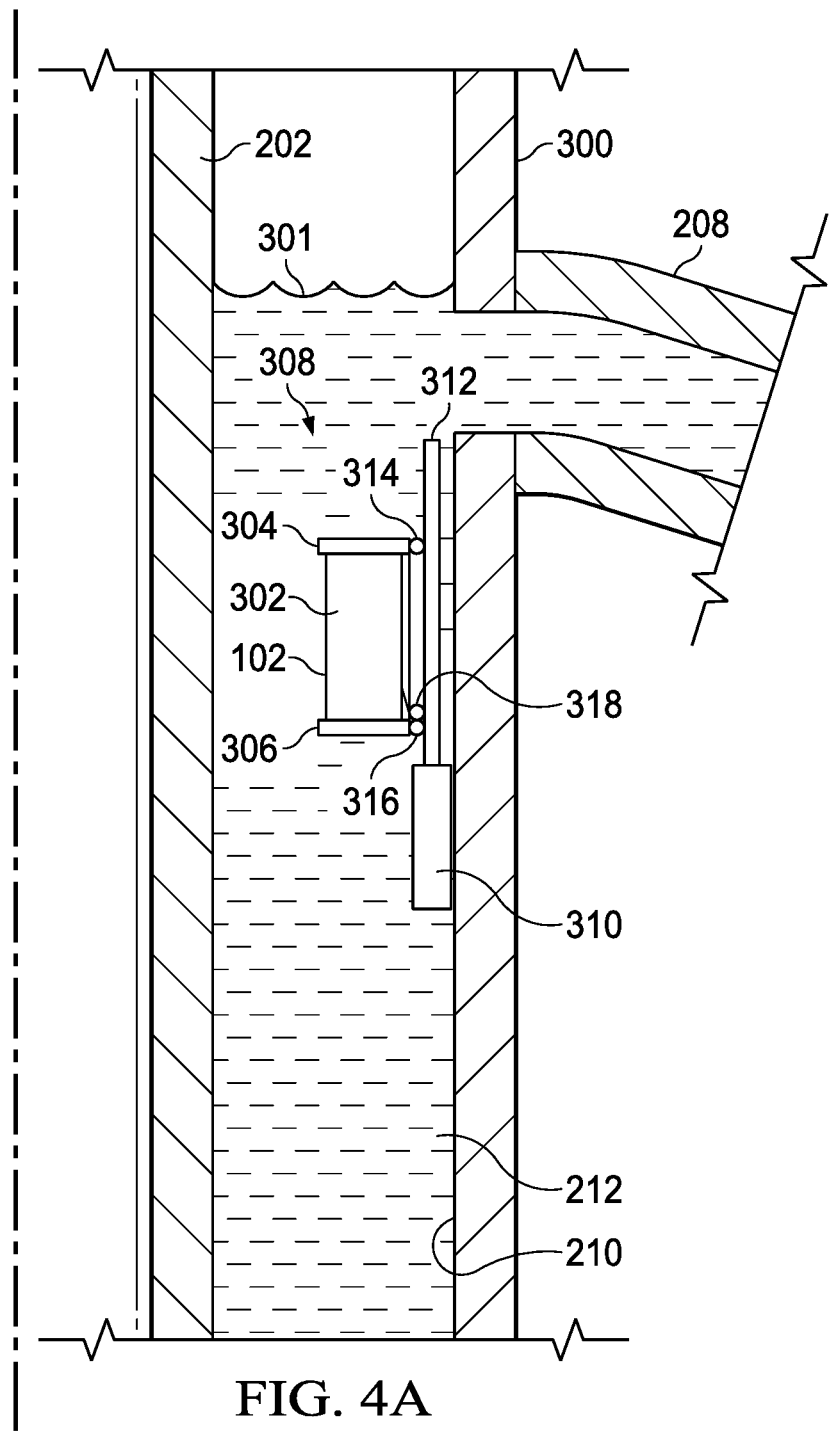
FIGS. 4A-4G are schematic diagrams of different stages of a mechanical arrangement to expose an air flow sensor to air flowing through the annulus.

FIG. 4A is a schematic diagram showing the sealing system preventing exposure of the air flow sensor to liquid in the annular region surrounding the housing 302. In this state, the liquid level 301 in the annular region surrounding the housing 302 is uphole of the uphole end of the housing 302. This state represents a normal wellbore drilling operation in which the liquid level 301 is uphole of an inlet to the flowline 208 from the casing 300. The sealing system includes a first sealing element 304 and a second sealing element 306 attached to the uphole end and the downhole end, respectively, of the housing 302. Each sealing element is configured to seal and unseal the respective end to which each sealing element is attached. For example, the sealing element is made of metal or polymer covered by rubber or elastic polymer material suitable for sealing. In the state schematically shown in FIG. 4A, both sealing elements have covered the respective open ends of the housing 302, thereby preventing liquid in the annular region surrounding the housing 302 from entering the internal volume defined by the housing 302. Consequently, the air flow sensor 102 disposed within the housing 302 is protected. The air flow sensor 102 can transmit signals even when the ends are covered. But, signals transmitted when the ends are covered are not used to calculate liquid level since the liquid level is above the air flow sensor.

Figure 4B:
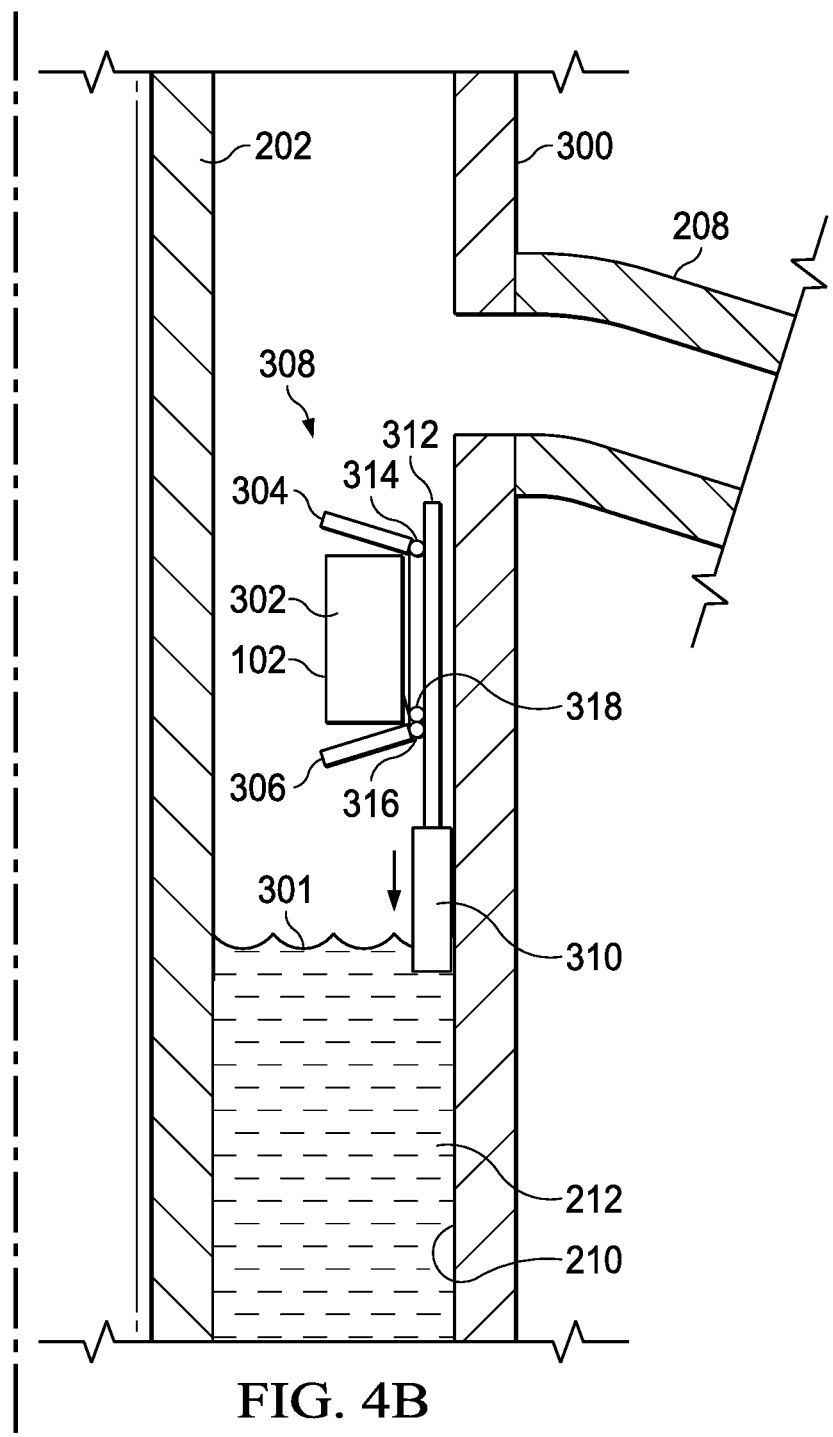

FIG. 4B is a schematic diagram showing the sealing system partially exposing the air flow sensor to air in the annular region surrounding the housing 302. In this state, the liquid level 301 in the annular region surrounding the housing 302 has dropped below the pre-determined level, for example, below the downhole end of the housing 302. As described earlier, the drop in liquid level can be due to loss of the liquid, that is, the wellbore drilling fluid, into a loss circulation zone in the formation in which the wellbore is being drilled. In the state schematically shown in FIG. 4B, the sealing system begins opening the ends of the housing 302 as the liquid level 301 in the annular region surrounding the housing drops.

The sealing system includes a sealing unit 308 disposed in the portion of the annulus 212. The sealing unit 308 is connected to the housing 302, the first sealing element 304 and the second sealing element 306. The sealing unit 308 is configured to actuate the first sealing element 302 and the second sealing element 304 to unseal the open ends as the liquid level 301 in the portion of the annulus falls below the pre-determined level. The sealing unit 308 includes a floating member 310 that can float in the liquid, that is, the wellbore drilling fluid, in the portion of the annulus. The floating member 308 is connected to the first sealing element 304 and the second sealing element 306. The floating member 308 travels in a downhole direction in the annulus as the liquid level 301 falls in the portion of the annulus and travels in an uphole direction as the liquid level 301 rises in the portion of the annulus. In some implementations, the floating member can have a shape of a cuboid with a size, for example, of 10 cm by 10 cm by 3 cm (thickness) and have a hollow structure made of polymer or metal that can float in the liquid whose level is being sensed. In some implementations, the floating member can be made of any material that has total specific gravity of less than 1 (lighter than water)

The sealing unit 308 includes a gear bar 312 connected to the floating member 308, the housing 302, the first sealing element 304 and the second sealing element 306. The gear bar 312 can cause the first sealing element 304 and the second sealing element to unseal the open ends of the housing 302 as the floating member 308 travels in the downhole direction due to a drop in the liquid level 301. The gear bar 312 can operate based on a simple motion transfer as the linear movement of the gear bar 312 turns into rotational movement of the cover in two directions. Alternatively, the gear bar 312 can be implemented using cam or link mechanisms to perform the same function.

In the state schematically shown in FIG. 4B, the floating member 308 actuates each of the first sealing element 304 and the second sealing element 306 to unseal the first open end and the second open end. To do so, the sealing unit 308 includes a first gear 314 and a second gear 316 connected to an end of the first sealing element 304 and the second sealing element 306, respectively. Both gears are also connected to, for example, mesh with, the gear bar 312. As the floating member 308 travels in a downhole direction, the gear bar 312, which is attached to the floating member 308, also travels in the downhole direction. In response, the first gear 314 and the second gear 316 rotate causing the first sealing element 304 and the second sealing element 306 to pivot and move away from the open ends. The sealing unit 308 includes a reverse gear 318 connected to the second gear 316 and the gear bar 312. The reverse gear 318 meshes with the second gear 316 causing the second gear 316 to rotate in a direction opposite that of the first gear 314 responsive to an uphole or a downhole movement of the gear bar 312.

The downhole flowing air enters the inner volume defined by the housing 302 and flows past the air flow sensor 102. The air flow sensor 102 senses the presence of the air or measures a flow speed of the air (or both) and transmits signals representing the sentencing or the measurement (or both) to the computer system 104 as described earlier.

Figure 4C:
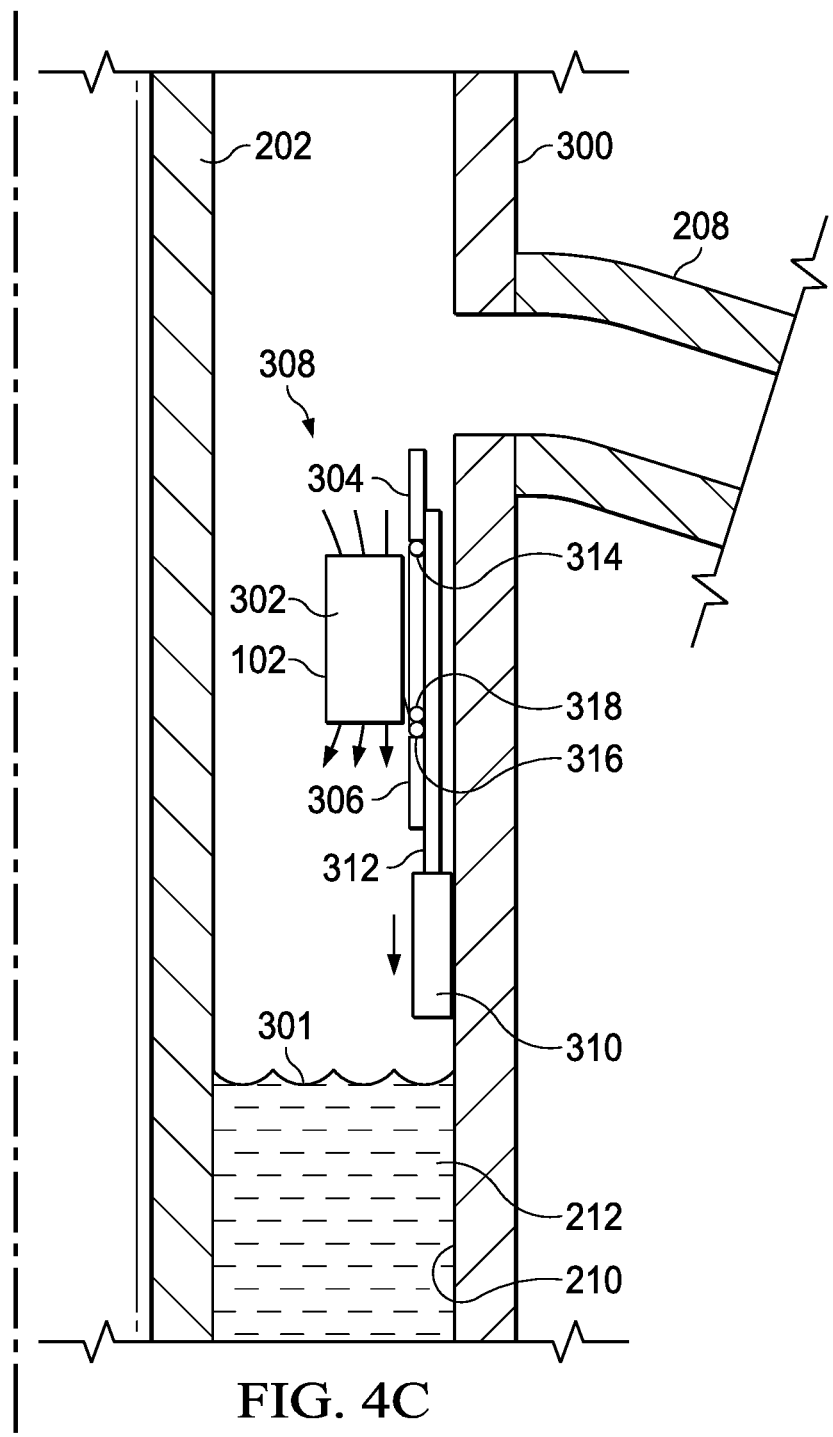

FIG. 4C is a schematic diagram showing the sealing system fully exposing the air flow sensor to air in the annular region surrounding the housing 302. In this configuration, the floating member 312 has traveled a maximum possible distance in the downhole direction. The maximum possible distance depends on the length of the gear bar 312, which, in turn, depends on the length of the housing 302. For example, when the gear bar 312 has traveled the maximum possible distance in the downhole direction, the first sealing element 304 and the second sealing element 306 can be perpendicular to the uphole end and the downhole end, respectively, of the housing 302. An upper end of the gear bar 312 can be as near to the first gear 314 as possible. Similarly, the floating member 312 has a maximum possible travel distance in the uphole direction. For example, when the gear bar 312 has traveled the maximum possible distance in the uphole direction, the first sealing element 304 and the second sealing element 306 can be parallel to and can sealingly cover the uphole end and the downhole end, respectively, of the housing 302. A lower end of the gear bar 312 can be as near to the second gear 316 as possible. The liquid level 301 can continue to drop even after the floating member 312 has traveled the maximum possible distance in the downhole direction.

Figure 4D:
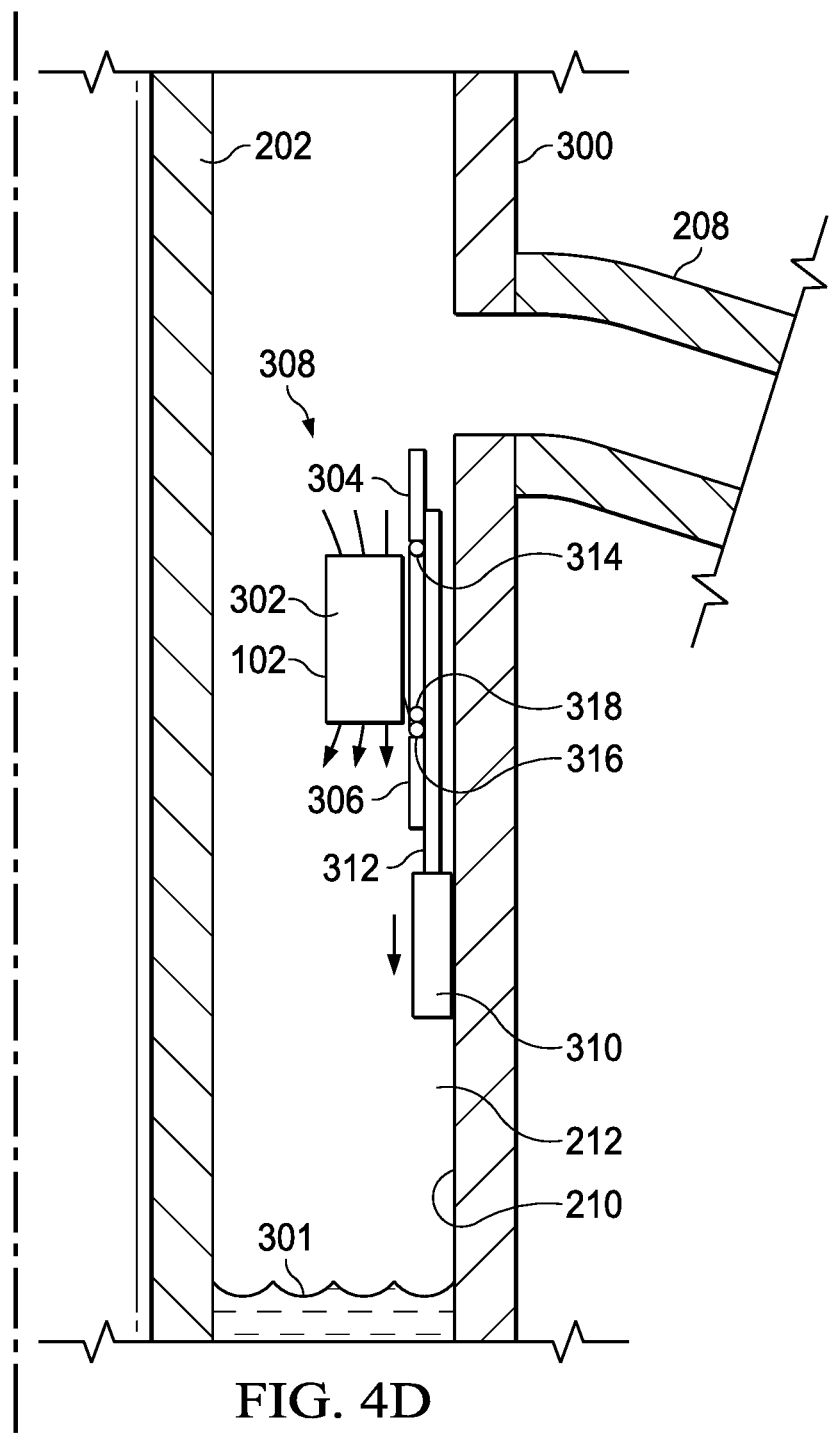
Figure 4E:
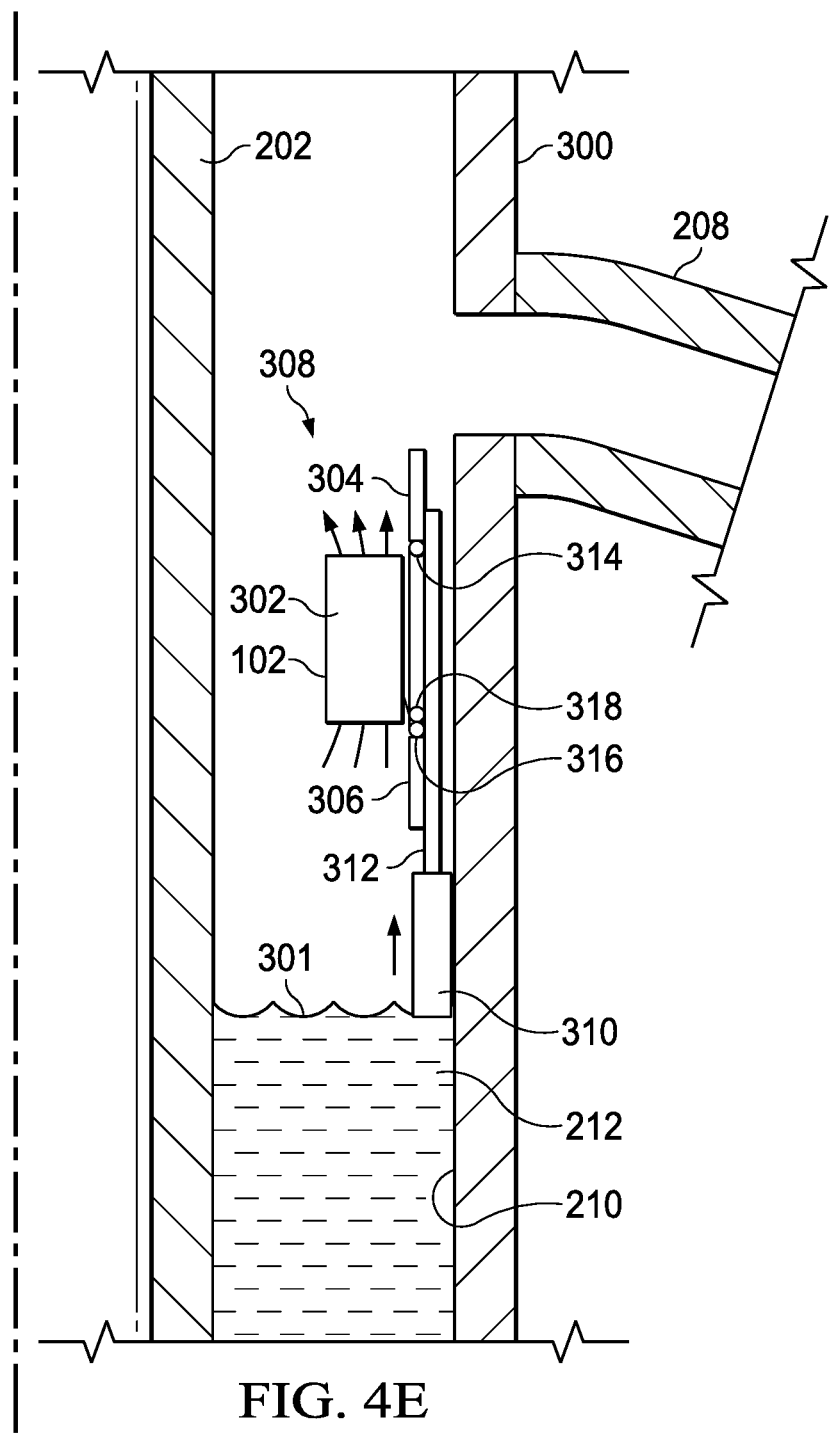

FIG. 4D is a schematic diagram showing the liquid level 301 having stabilized after falling within the annular region relative to the state shown in FIG. 4A, as described earlier, the air flow sensor 102 disposed in the inner volume defined by the housing 302 senses the presence of or measures the air flow speed of (or both) air flowing through the housing 302. The air flow sensor 102 generates signals representing the presence of air or the measured air flow speed (or both) and transmits the signals to the computer system 104. In some implementations, the computer system 104 is configured to not use the signals to determine the liquid level unless the sealing elements are fully open as shown in FIG. 4C, 4D or 4E. In such implementations, the computer system 104 is configured to determine the liquid level based on a movement of the floating member 308. For example, dimensions of the floating member 308, the gear bar 312 and the maximum possible travel distances in the uphole direction or the downhole direction (described earlier) are stored in the computer system 104. The location of the housing 302 in the annulus 212 is also stored in the computer system 104. The pre-determined liquid level at which the sealing elements open the ends of the housing 302 is also stored in the computer system 104. As described earlier, the floating member 308 commences travel in the downhole direction when the liquid level 301 falls below the pre-determined liquid level. When the floating member 308 commences travel in the downhole direction, a signal can be transmitted to the computer system 104. If the floating member 308 ceases travel in the downhole direction before reaching the maximum possible travel distance, that indicates that the liquid level has stopped falling in the annulus. The computer system 104 can determine the liquid level 301 using the dimensions of the floating member 308 and the downhole distance traveled by the floating member 308. If the floating member 308 travels the maximum possible distance in the downhole direction, then the computer system 104 can determine the liquid level 301 using the signals received from the air flow sensor 102, as described earlier. In some implementations, the computer system 104 can use the liquid level determined based on the travel of the floating member 308 to calibrate the liquid level determined based on signals received from the air flow sensor 102.

FIG. 4E is a schematic diagram showing the air flow sensor fully exposed to air in the annular region surrounding the housing 302. In the state schematically shown in FIG. 4E, the liquid level in the annular region begins to rise towards the housing. For example, the liquid level may rise because remedial actions to seal fluid loss into the loss circulation zone have been implemented, and the wellbore drilling process has returned to a normal state, such as the one schematically shown in FIG. 4A. As the liquid level rises, the air in the annular region surrounding the housing is pushed by the rising liquid in the uphole direction. The sealing elements remain open end, the air flow sensor 102 continues to sense the presence of air or measure the air flow speed (or both), this time as the airflows in the uphole direction. The air flow sensor 102 can not only detect air speed but also the direction of the air flow. In the state, the volume of air in the annular region surrounding the housing 302 continues to decrease as the liquid level rises. The computer system 104 can determine the rising liquid level. By implementing the techniques described earlier.

Figure 4F:
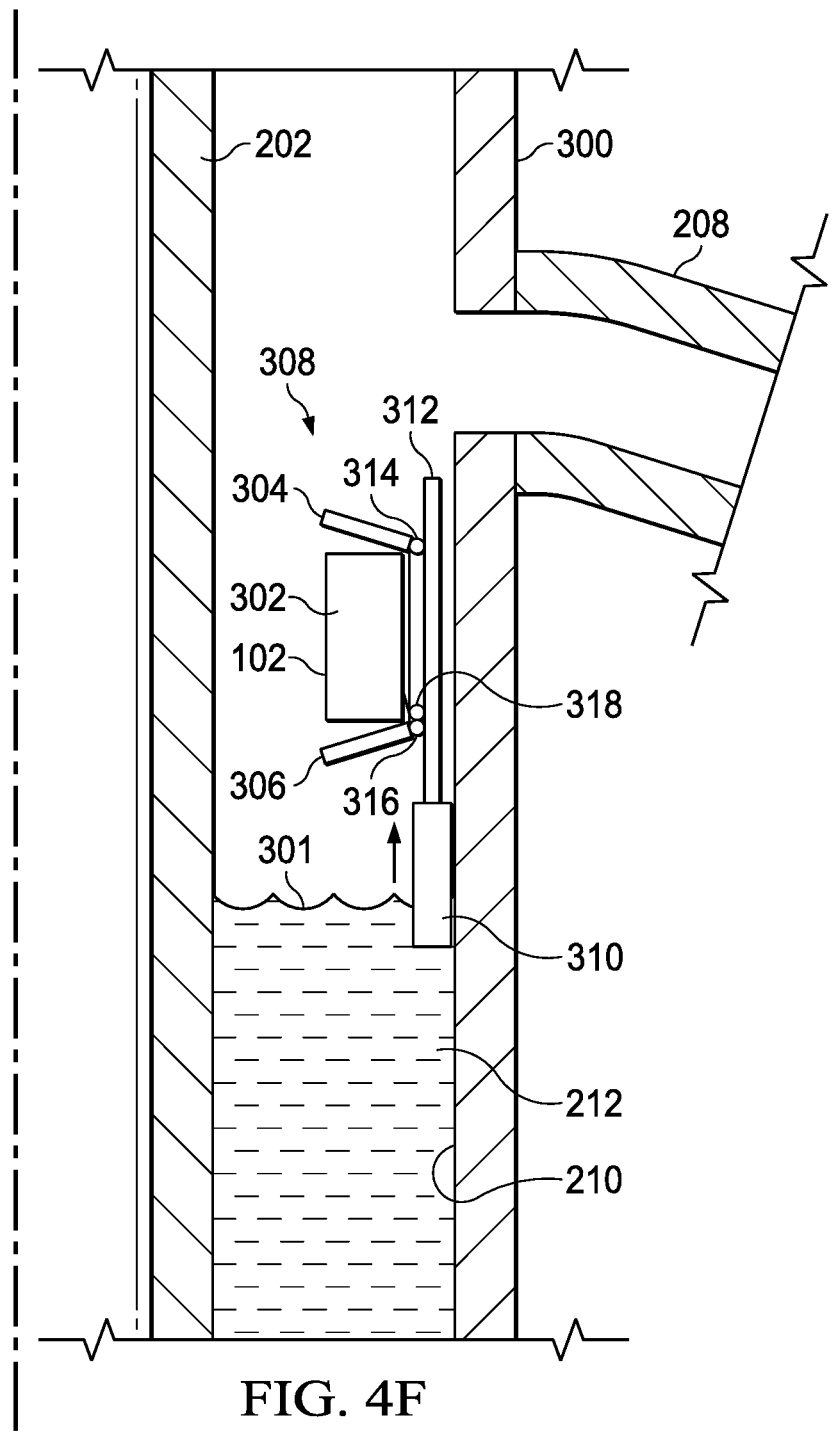
Figure 4G:
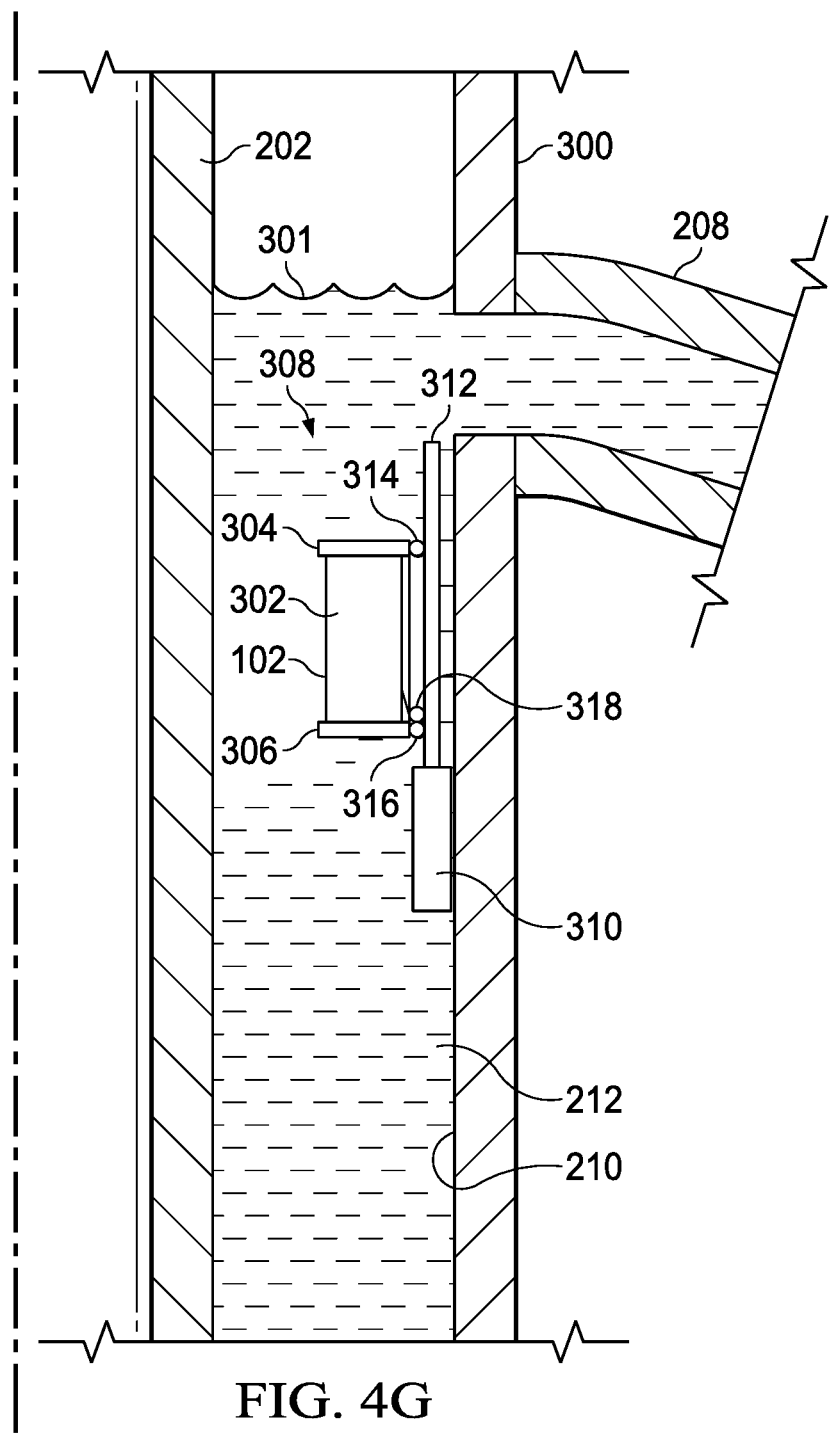

FIG. 4F is a schematic diagram showing the sealing system beginning to seal the air flow sensor to air in the annular region surrounding the housing 302. In this state, the liquid level 301 in the annular region surrounding the housing 302 has risen to the lowest position of the floating member 308. As the liquid level continues to rise, the floating member 308 rises with the liquid level causing the gear bar 312 to travel in the uphole direction and actuate the first sealing element 304 and the second sealing element 306 the uphole end and the downhole end, respectively, of the housing 302. FIG. 4G is a schematic diagram in which the sealing system has returned to the state schematically shown in FIG. 4A and is preventing exposure of the air flow sensor to liquid in the annular region surrounding the housing 302.

Figure 5:
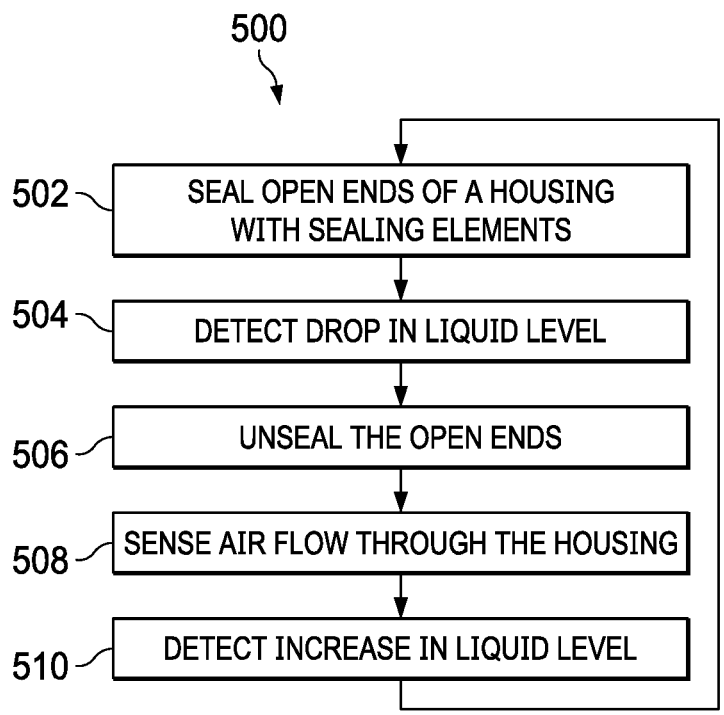
FIG. 5 is a flowchart of an example of a process of implementing the mechanical arrangement of FIGS. 4A-4G.

FIG. 5 is a flowchart of an example of a process 500 of implementing the mechanical arrangement of FIGS. 4A-4G. The process 500 can be implemented by the sealing system shown in and described with reference to FIGS. 4A-4G. At 502, open ends of the housing disposed in the portion of the annulus within the bell nipple below the rotary table of the wellbore drilling assembly are sealed. At 504, a drop in the liquid level in the portion of the annulus is detected. At 506, the ends of the housing are unsealed in response to detecting the drop in the liquid level in the portion of the annulus. At 508, air flow through the housing is sensed. At 510, an increase in a liquid level in the portion of the annulus is detected. In response, the ends of the housing are sealed with the sealing elements as described earlier with reference to process step 502.

Figure 6:
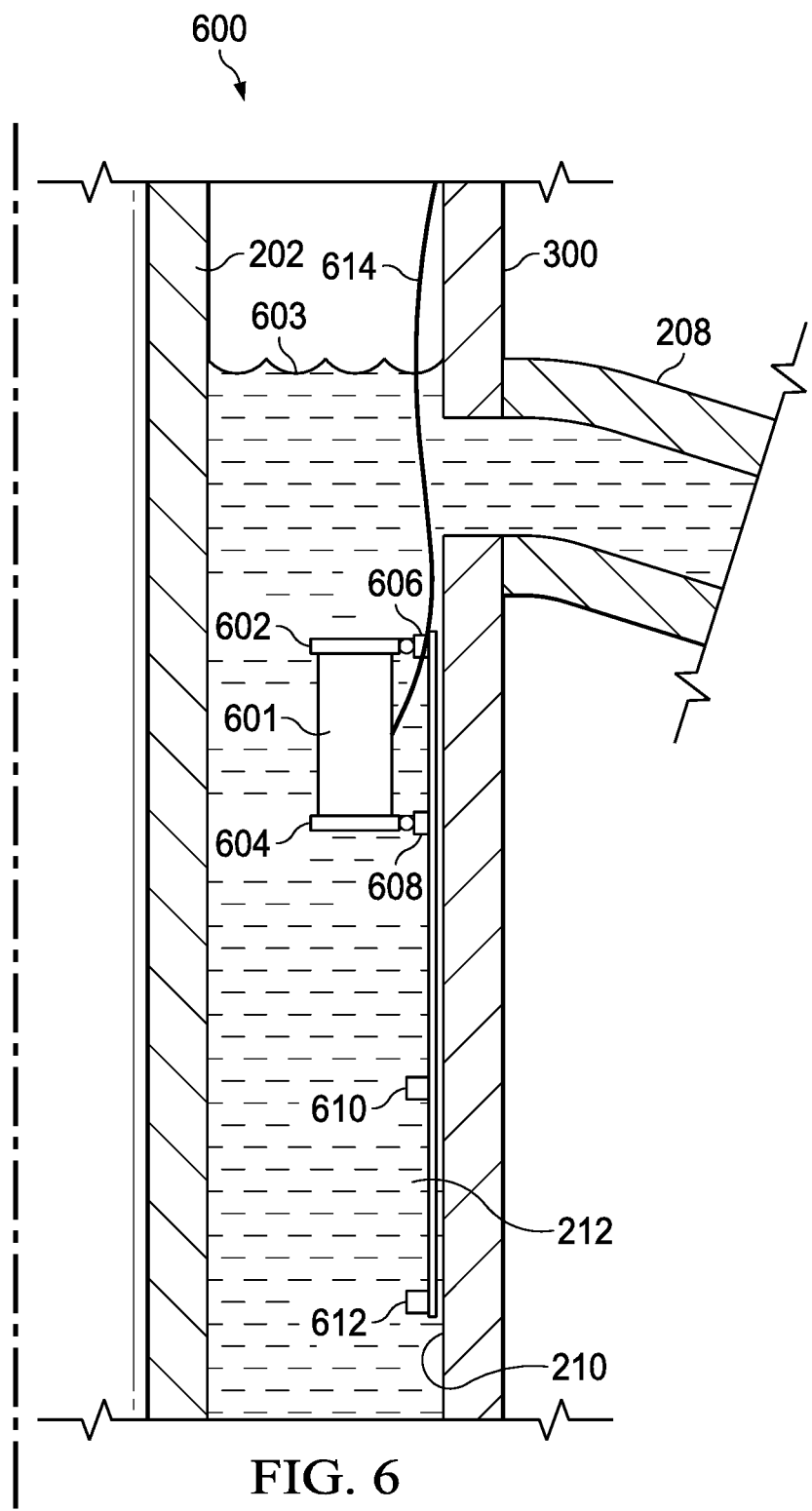
FIG. 6 is a schematic diagram of an electrical arrangement to expose an air flow sensor to air flowing through the annulus.

FIG. 6 is a schematic diagram of an electrical arrangement to expose an air flow sensor to air flowing through the annulus. The electrical arrangement can be implemented as an alternative to the mechanical arrangement described earlier with reference to FIGS. 4A-4H or as an additional arrangement to expose an additional air flow sensor. The electrical arrangement can be implemented as a sealing system that can prevent exposure of the air flow sensor 102 to liquid in the annular region surrounding the air flow sensor 102 and permit exposure only when the annular region is liquid-free. The system includes a housing 601 configured to be securely disposed in a portion of an annulus within the bell nipple below the rotary table of the wellbore drilling assembly. For example, the housing 601 is substantially identical to the housing 601.

The ends (for example, an uphole end and a downhole end) of the housing 601 are open. As a result, the ends of the housing 601 permit fluid to flow within an internal volume defined by the housing 601. An air flow sensor, for example, the air flow sensor 102 can be disposed within the internal volume defined by the housing 601. When the liquid level in the annulus 212 defined by an outer wall of the drill pipe 202 and an inner wall of the wellbore 210 drops below a pre-determined level, for example, a location at which a sensor (described later) is disposed in the annulus, then air that flows downhole through the annular region, flows through the internal volume defined by the housing 601. In such instances, the air flow sensor 102 performs operations described earlier. However, when the liquid level in the annulus 212 is above the pre-determined level, then the system prevents the airflow sensor 102 from being exposed to the liquid in the annular region surrounding, that is, uphole and downhole of, the housing 601.

FIG. 6 is a schematic diagram showing the system preventing exposure of the air flow sensor to liquid in the annular region surrounding the housing 601. In this state, the liquid level DCI in the annular region surrounding the housing 601 is uphole of the uphole end of the housing 601. This state represents a normal wellbore drilling operation in which the liquid level 603 is uphole of an inlet to the flowline 208 from the casing 300. The system includes a first cover 602 and a second cover 604 attached to the uphole end and the downhole end, respectively, of the housing 601. Each cover is configured to cover and uncover the respective end to which each cover is attached. Each cover is substantially identical to the sealing element described earlier with reference to FIGS. 4A-4h. in the state schematically shown in FIG. 6, both covers have covered the respective open ends of the housing 601, thereby preventing liquid in the annular region surrounding the housing 601 from entering the internal volume defined by the housing 601. Consequently, the air flow sensor 102 disposed within the housing 601 is protected.

Due to change in the wellbore drilling conditions, for example, due to loss of drilling fluid to loss circulation zones, the liquid level 603 in the annular region surrounding the housing 601 drops below the pre-determined level. The system includes an actuation unit disposed in the portion of the annulus 212. The actuation unit is connected to the housing 601, the first cover 602 and the second cover 604. The actuation unit is configured to actuate the pair of covers to cover or uncover the pair of ends, respectively, based on a liquid level in the portion of the annulus. For example, the actuation unit is configured to open the pair of covers as the liquid level 603 in the portion of the annulus falls below the pre-determined level. To do so, the actuation unit includes a pair of liquid sensors (a first liquid sensor 610, a second liquid sensor 612) disposed in the annulus downhole of the housing 601. The two sensors are axially spaced apart from each other. Each liquid sensor is configured to transmit a signal upon contacting a liquid. Conversely, each liquid sensor is configured to cease transmitting a signal upon contacting the liquid. Alternatively, the sensor can be configured to not transmit a signal upon contacting a liquid and to transmit a signal upon ceasing to contact the liquid.

The pair of liquid sensors is operatively coupled to the pair of covers. The pair of covers is configured to cover or uncover the pair of ends responsive to signals transmitted by the pair of liquid sensors upon contacting or ceasing to contact the liquid. For example, the first liquid sensor 610 can be disposed in the annulus uphole of the second liquid sensor 612. As long as the liquid level 603 is at or uphole of the location of the first liquid sensor 610, the pair of covers 602, 604 can be closed. When the liquid level 603 is at or downhole of the location of the second liquid sensor 612, the pair of covers 602, 604 can be open. When the liquid level 603 is in between the locations of the first liquid sensor 610 and the second liquid sensor 612, then the pair of covers 602, 604 can be partially opened or closed.

In some implementations, the covers are motorized. For example, the first cover 602 is attached to a motor 606. The second cover 604 is attached to a motor 608. The motors are operatively coupled to the liquid sensors and are configured to receive electrical or data signals or both from the liquid sensors. In an example in which the liquid level 603 is at or uphole of the location of the first liquid sensor 610 (that is, both liquid sensors are submerged in the liquid), the motors 606, 608 maintain the respective covers 602, 604 in a closed state. When the liquid level 603 falls downhole of the location of the first liquid sensor 610, the liquid sensor 610 either transmits a signal to the pair of motors or ceases to transmit a signal to the pair of motors, causing the pair of motors to open the pair of covers. When the liquid level 603 falls downhole of the location of the second liquid sensor 612, the liquid sensor 612, also, either transmits a signal to the pair of motors, or ceases to transmit a signal to the pair of motors, causing the pair of motors to maintain the pair of covers in the open state. In this example, the pair of motors is configured to initiate transition of the pair of covers from the open state to the closed state once the liquid level 603 drops below the location of the first liquid sensor 610, and to complete the transition to the closed state once the liquid level 603 drops below the location of the second liquid sensor 612.

In another example, in which the liquid level 603 is downhole of the location of the second liquid sensor 612 (that is, neither liquid sensor is submerged in the liquid), the motors 606, 608 maintain the respective covers 602, 604 in an open state. When the liquid level 603 prices uphole of the location of the second liquid sensor 612, the liquid sensor 612, either transmits a signal to the pair of motors, or ceases to transmit a signal to the pair of motors, causing the pair of motors to initiate closure of the pair of covers. When the liquid level 603 prices uphole of the location of the first liquid sensor 612, the liquid sensor 612, also, either transmits a signal to the pair of motors, or ceases to transmit a signal to the pair of motors, causing the pair of motors to maintain the pair of covers in the closed state. In this example, the pair of motors is configured to initiate closure of the pair of covers from the closed state to the open state once the liquid level 603 rises above the location of the second liquid sensor 612, and to complete the transition to the open state once the liquid level 603 rises above the location of the first liquid sensor 610.

Figure 7:
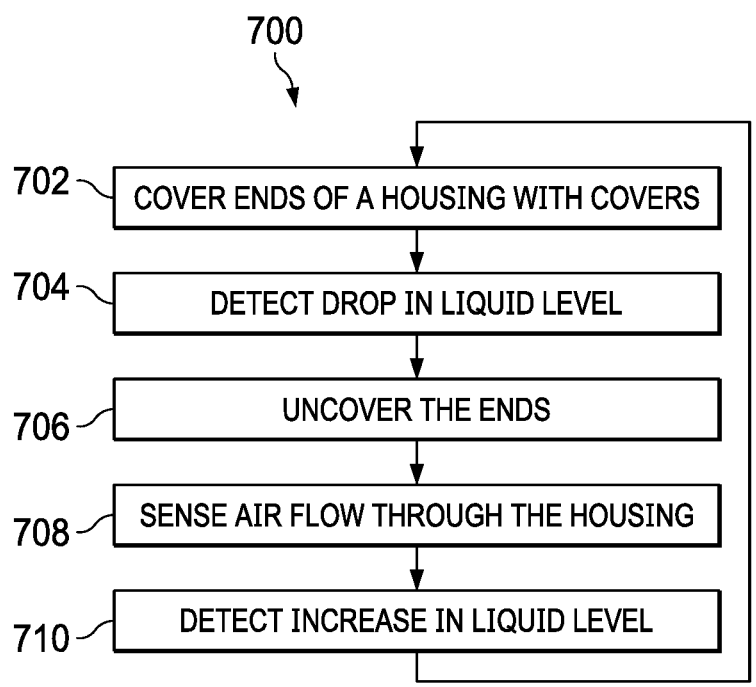
FIG. 7 is a flowchart of an example of a process of implementing the electrical arrangement of FIG. 6.

FIG. 7 is a flowchart of an example of a process 700 of implementing the electrical arrangement of FIG. 6. The process 700 can be implemented by the system shown in and described with reference to FIG. 6. At 702, ends of a housing disposed in the portion of the annulus within the bell nipple below the rotary table of the wellbore drilling assembly are closed. At 704, a drop in the liquid level in the portion of the annulus is detected. At 706, the ends of the housing are uncovered in response to detecting the drop in the liquid level in the portion of the annulus. At 708, air flow through the housing is sensed. At 710, an increase in a liquid level in the portion of the annulus is detected. In response, the ends of the housing are covered with the covers as described earlier with reference to process 702.

Figure 8:
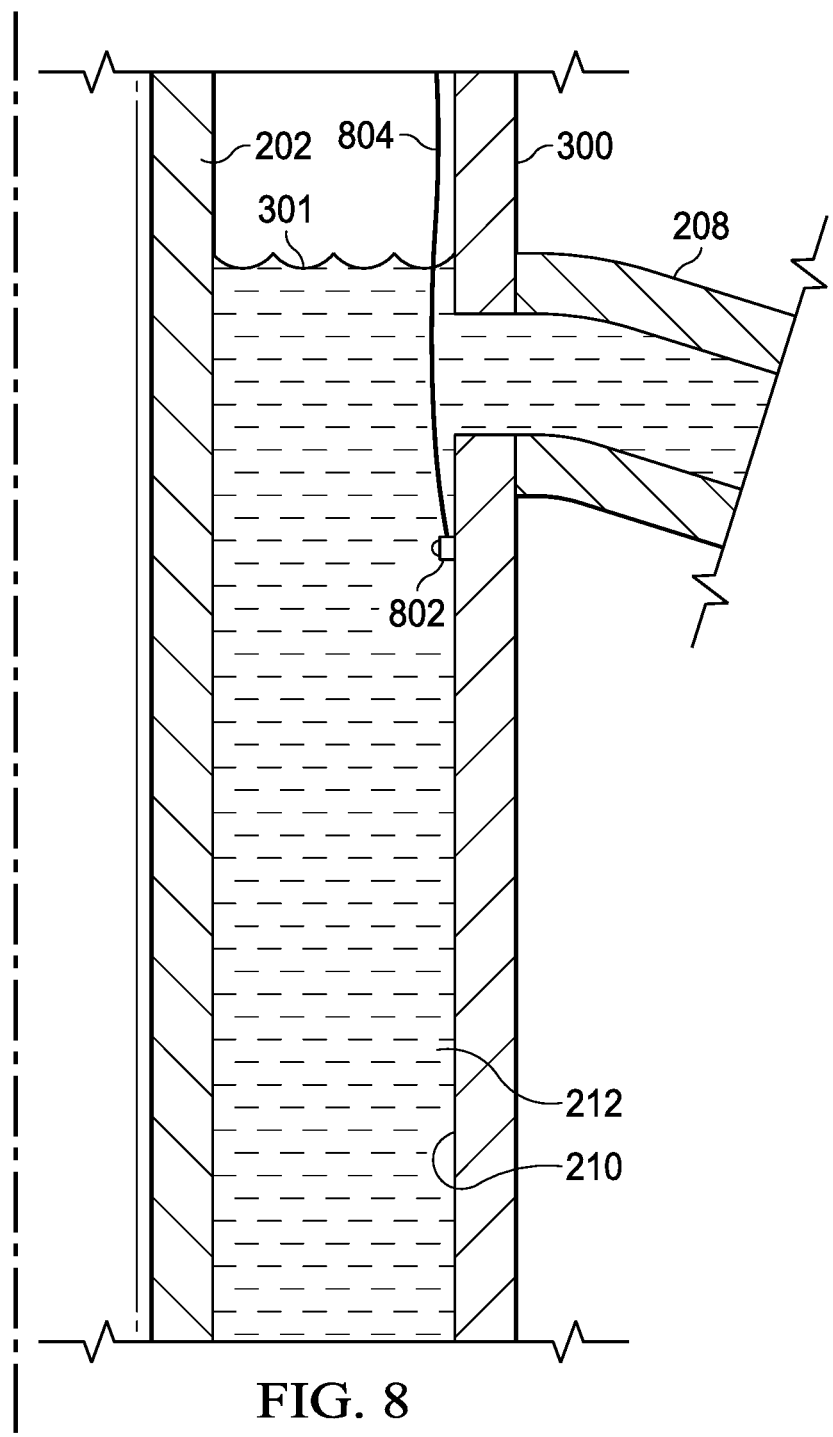
FIG. 8 is a schematic diagram of a flow sensor for measuring liquid level in the annulus.

FIG. 8 is a schematic diagram of a flow sensor 802 for measuring liquid level 301 in the annulus 212. The flow sensor 802 differs from the air flow sensor 102 described earlier, in that the flow sensor 802 can make measurements in both dry and wet environments, for example, often dry gas and wet gas flow. Consequently, the sealing arrangement described earlier is not necessary when implementing the flow sensor 802. Examples of the flow sensor 802 include an ultrasonic flow meter or an optics-based gas flow meter. The flow sensor 802 can measure the gas flow. When the liquid level 301 is below the pre-determined level of liquid in the annulus 212. A computer system (not shown). In some implementations, the cable 804, for example, a data, and power cable, can be run from the flow sensor 802 to the computer system to exchange signals. Similar to the computer system 104 can be operatively connected to the flow sensor 802 to determine the liquid level 301 through the effective flow rate calculated by the FEM analysis, the cross-sectional area and time integration, as described earlier. In addition, the flow sensor 802 can also pick up the signal when the sensor 802 is submerged in the drilling fluid, which serves as a way to calibrate the liquid level 301.

Figure 9:
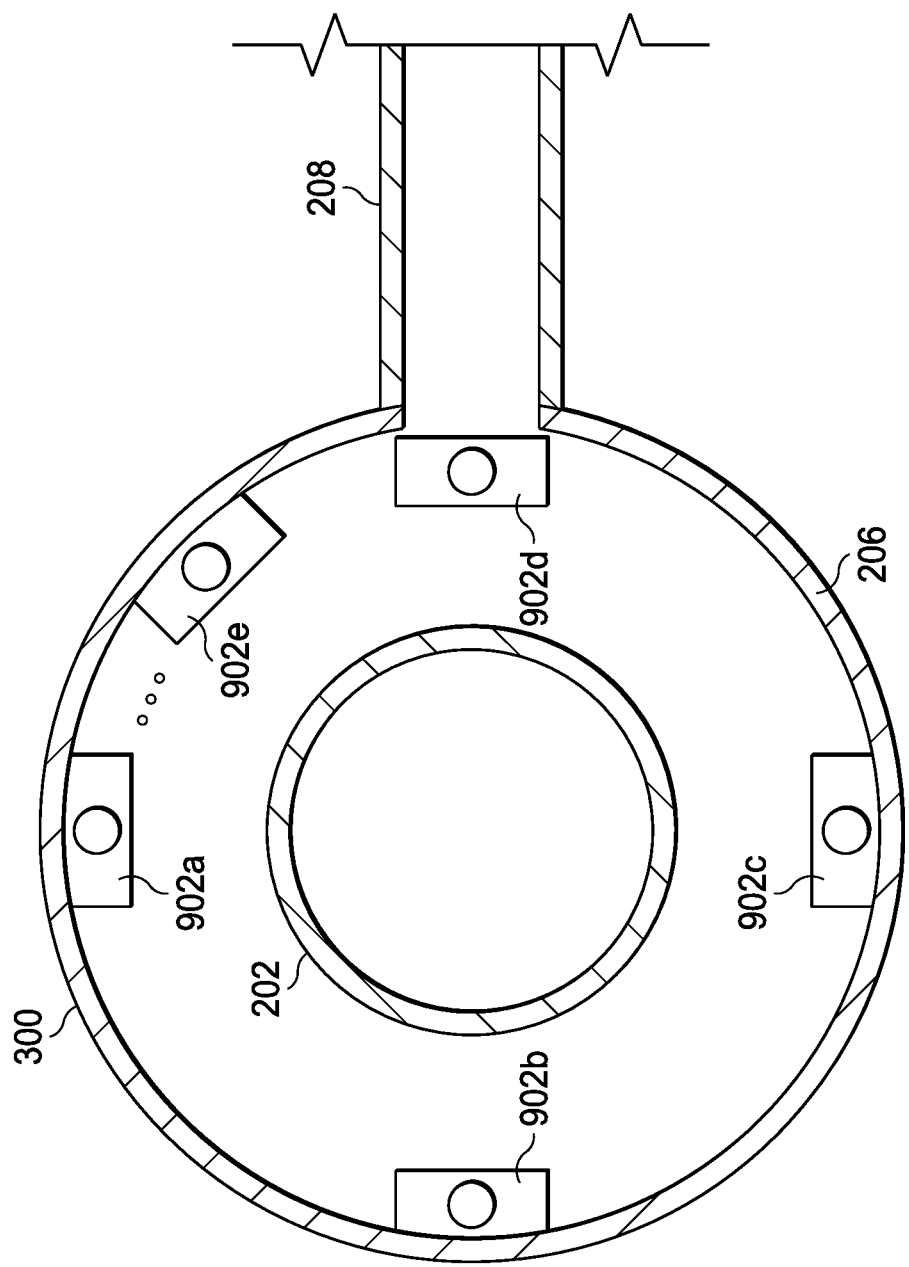
FIG. 9 is a schematic diagram of multiple flow sensors for measuring liquid level in the annulus.

FIG. 9 is a schematic diagram of multiple flow sensors for measuring liquid level in the annulus. The multiple sensors can include sensors 902a, 902b, 902c, 902d, 902e (or more or fewer, but at least two, sensors). The multiple sensors are distributed on an inner circumferential wall of the casing 300. In some implementations, the multiple sensors can be distributed uniformly on the inner wall such that a circumferential distance between any two adjacent sensors is the same. Alternatively, in some implementations, the multiple sensors can be staggered at different circumferential distances from each other. In some implementations, all the sensors can be on the same radial plane. That is, all the sensors can be placed at the same depth in the annulus from the rotary table. Also, in some implementations, one of the sensors can be positioned at the inlet to the flowline 208 through which the drilling fluid flows out of the annulus. Increasing the number of sensors enhances the accuracy of measurement of the liquid level. For example, the computer system can combine a liquid level determined based on measurements performed by each sensor to increase the accuracy of the liquid level in the annulus. The air flow speeds that are measured by each flow sensor are local air speed subject to the position of the sensor and the partial air flow with respect to the total air flow. Theoretical, the total air flow can either be obtained if the air is flowing evenly and all the sensor are measuring the same value, or if there are indefinite number of sensors installed that can measure the air speed at all positions around the pipe. In reality, neither of the cases is valid, therefore, we propose to use a definite number of sensors to measure limited number of local air speed and based on the pipe position at each moment, to simulate the effective air flow speed that best represents the actual air flow speed using the FEM.

The multiple sensors shown in FIG. 9 can be the same or can be different. For example, one or more of the sensors can be similar to the air flow sensor 102 that are implemented with a sealing system described earlier. Such sensors can be sealed using either the electrical arrangement of the mechanical arrangement described earlier. Some of the sensors can be similar to the flow sensor 802 described earlier, and can be implemented without the sealing system described earlier.

Figure 10:
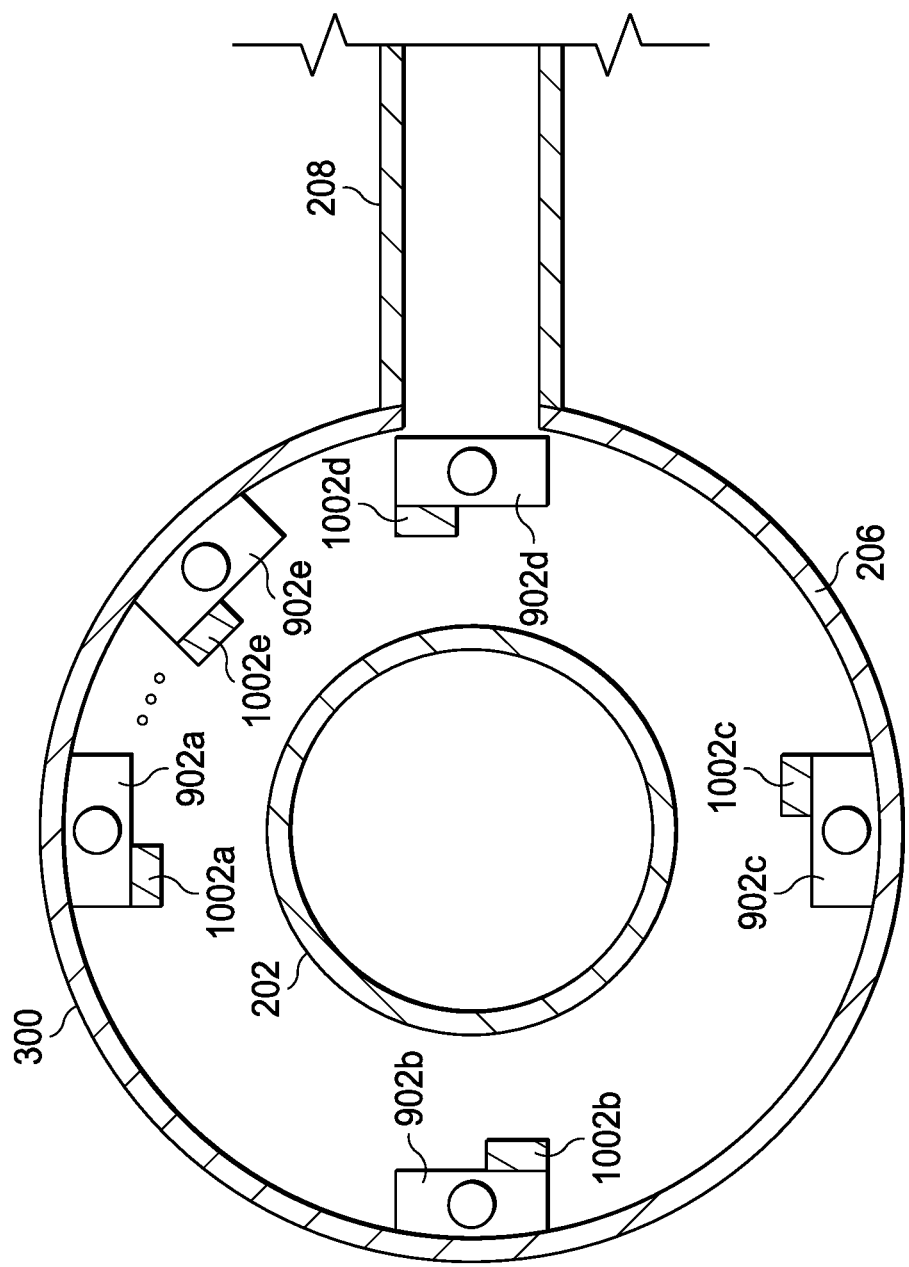
FIG. 10 is a schematic diagram of multiple flow sensor systems for measuring liquid level in the annulus.

FIG. 10 is a schematic diagram of multiple flow sensor systems for measuring liquid level in the annulus. The multiple flow sensor systems can include the multiple flow sensors similar to those shown in and described with reference to FIG. 9. In addition, each flow sensor can be connected to a respective distant sensor (for example, distant sensors 1002a, 1002b, 1002c, 1002d, 1002e), each of which can measure the gap between the flow sensor to which the distant sensor is attached and the drill pipe 202, at the same time. When the flow sensor measures the air flow rate. The distance data is further used, to enhance the accuracy of the FEM analysis by providing the relative positions of the drill pipe 202 versus the bell nipple 206.

Thus, particular implementations of the subject matter have been described. Other implementations are within the scope of the following claims.

The invention claimed is:

1. A sealing system comprising:
a housing configured to be securely disposed in a portion of an annulus within a bell nipple below a rotary table of a wellbore drilling assembly, the annulus formed by a drill string of the wellbore drilling assembly and an inner wall of a wellbore being drilled by the wellbore drilling assembly, the housing comprising a first open end and a second open end, the housing configured to house an air flow sensor disposed within the housing;
a first sealing element attached to the first open end of the housing, the first sealing element configured to seal and unseal the first open end;
a second sealing element attached to the second open end of the housing, the second sealing element configured to seal and unseal the second open end; and
a sealing unit disposed in the portion of the annulus, the sealing unit connected to the housing, the first sealing element and the second sealing element, the sealing unit configured to actuate the first sealing element and the second sealing element to seal or unseal the first open end and the second open end, respectively, based on a liquid level in the portion of the annulus.

2. The sealing system of claim 1, wherein the sealing unit comprises a floating member configured to float in a liquid in the portion of the annulus, the floating member connected to the first sealing element and the second sealing element, the floating member configured to travel in a downhole direction as the liquid level falls in the portion of the annulus and to travel in an uphole direction as the liquid level rises in the portion of the annulus.

3. The sealing system of claim 2, wherein the floating member is configured to actuate each of the first sealing element and the second sealing element to unseal the first open end and the second open end, respectively, responsive to the floating member traveling in the downhole direction and to seal the first open end and the second open, respectively, responsive to the floating member traveling in the uphole direction.

4. The sealing system of claim 3, wherein the sealing unit comprises a gear bar connected to the floating member, the housing, the first sealing element and the second sealing element, the gear bar configured to cause the first sealing element and the second sealing element to seal or unseal the first open end and the second open end, respectively, responsive to the floating member traveling in the uphole direction or the downhole direction, respectively.

5. The sealing system of claim 3, further comprising a first gear connected to an end of the first sealing element and to the gear bar, the first gear configured to pivot the first sealing element about the end responsive to a movement of the floating member.

6. The sealing system of claim 3, further comprising a second gear connected to an end of the second sealing element and to the gear bar, the second gear configured to pivot the second sealing element about the end responsive to a movement of the floating member.

7. The sealing system of claim 6, further comprising a reverse gear connected to the second gear and to the gear bar, the reverse gear connected between the second gear and the end of the second sealing element, the reverse gear configured to pivot the second sealing element in a direction opposite a direction in which the first gear pivots the first sealing element.

8. The sealing system of claim 1, further comprising the air flow sensor disposed within the housing, the air flow sensor configured to sense air flowed through the first open end and the second open end of the housing responsive to the sealing unit unsealing the first open end and the second open end based on the liquid level in the portion of the annulus falling below a position of the housing in the portion of the annulus.

9. A method comprising:
sealing open ends of a housing securely disposed in a portion of an annulus within a bell nipple below a rotary table of a wellbore drilling assembly, the annulus formed by a drill string of the wellbore drilling assembly and an inner wall of a wellbore being drilled by the wellbore drilling assembly, an air flow sensor disposed within the housing, at least a portion of the housing contacting a liquid in the portion of the annulus;
in response to a liquid level in the portion of the annulus falling below at least the portion of the housing, unsealing the open ends of the housing; and
sensing, by the air flow sensor, air flowed through the open ends of the housing caused by the falling of the liquid level.

10. The method of claim 9, wherein sealing the open ends of the housing comprises:
attaching an end of a first sealing element to a first open end of the open ends of the housing;
attaching an end of a second sealing element to a second open end of the open ends of the housing; and
pivoting the first sealing element and the second sealing element about the respective ends from an unsealed position to a sealed position.

11. The method of claim 10, wherein unsealing the open ends of the housing comprises pivoting the first sealing element and the second sealing element from the sealed position to the unsealed position.

12. The method of claim 11, wherein the housing, the first sealing element and the second sealing element are connected to a sealing unit disposed in the portion of the annulus, wherein sealing the open ends of the housing or unsealing the open ends of the housing comprises actuating, by the sealing unit, the first sealing element and the second sealing element to seal or unseal, respectively, the first sealing element and the second sealing element to the open ends.

13. The method of claim 12, wherein the sealing unit comprises a floating member configured to float in the liquid in the portion of the annulus, wherein the method further comprises:

traveling, by the floating member, in an uphole direction within the annulus to seal the first sealing element and the second sealing element to the open ends of the housing; and
traveling, by the floating member, in a downhole direction within the annulus to unseal the first sealing element and the second sealing element to the open ends of the housing.

14. The method of claim 13, further comprising, after sensing, by the air flow sensor, the air flowed through the open ends of the housing, re-sealing the open ends of the housing in response to the liquid level in the portion of the annulus rising to at least the portion of the housing.

15. A system comprising:
a housing configured to be securely disposed in a portion of an annulus within a bell nipple below a rotary table of a wellbore drilling assembly, the annulus formed by a drill string of the wellbore drilling assembly and an inner wall of a wellbore being drilled by the wellbore drilling assembly, the housing comprising a hollow internal chamber;
an air flow sensor disposed within the hollow internal chamber, the air flow sensor configured to sense flow of air through the hollow internal chamber;
a first sealing element attached to a first end of the housing;
a second sealing element attached to a second end of the housing; and
a sealing unit disposed in the portion of the annulus, the sealing unit connected to the housing, the first sealing element and the second sealing element, the sealing unit configured to seal or unseal the first end and the second end using the first sealing element and the second sealing element, respectively, based on a liquid level in the portion of the annulus.

16. The system of claim 15, wherein the sealing unit comprises a floating member less dense than a liquid in the portion of the annulus, the floating member configured to sink within the portion of the annulus as the liquid level falls in the portion of the annulus and to rise within the portion of the annulus with the liquid as the liquid level rises in the portion of the annulus.

17. The system of claim 15, wherein the floating member is configured to actuate each of the first sealing element and the second sealing element to unseal the first open end and the second open end, respectively, responsive to the floating member traveling in the downhole direction and to seal the first open end and the second open, respectively, responsive to the floating member traveling in the uphole direction.

* * * * *

UNITED STATES PATENT AND TRADEMARK OFFICE
CERTIFICATE OF CORRECTION

| | |
|---|---|
| PATENT NO. | : 11,280,178 B2 |
| APPLICATION NO. | : 16/829919 |
| DATED | : March 22, 2022 |
| INVENTOR(S) | : Bodong Li et al. |

It is certified that error appears in the above-identified patent and that said Letters Patent is hereby corrected as shown below:

In the Claims

Column 20, Line 40, Claim 3, replace "open" with -- open end, --.

Column 22, Line 47, Claim 17, replace "open" with -- open end, --.

Signed and Sealed this
Twenty-fourth Day of May, 2022

*Katherine Kelly Vidal*
Katherine Kelly Vidal
*Director of the United States Patent and Trademark Office*